(12) United States Patent
Li et al.

(10) Patent No.: US 11,716,478 B2
(45) Date of Patent: *Aug. 1, 2023

(54) ADJUSTMENTS TO ENCODING AND DECODING WHEN SWITCHING COLOR SPACES

(71) Applicant: Microsoft Technology Licensing, LLC, Redmond, WA (US)

(72) Inventors: Bin Li, Beijing (CN); Jizheng Xu, Beijing (CN); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/381,061

(22) Filed: Jul. 20, 2021

(65) Prior Publication Data
US 2021/0352305 A1    Nov. 11, 2021

Related U.S. Application Data

(63) Continuation of application No. 16/867,198, filed on May 5, 2020, now Pat. No. 11,102,496, which is a (Continued)

(51) Int. Cl.
| | |
|---|---|
| *H04N 19/70* | (2014.01) |
| *H04N 19/186* | (2014.01) |
| *H04N 19/176* | (2014.01) |
| *H04N 19/126* | (2014.01) |
| *H04N 1/64* | (2006.01) |
| *H04N 19/184* | (2014.01) |

(52) U.S. Cl.
CPC ........... *H04N 19/186* (2014.11); *H04N 1/644* (2013.01); *H04N 19/126* (2014.11); *H04N 19/176* (2014.11); *H04N 19/184* (2014.11); *H04N 19/70* (2014.11)

(58) Field of Classification Search
CPC .......................... H04N 19/126; H04N 19/186
USPC ...................................................... 375/240
See application file for complete search history.

(56) References Cited

U.S. PATENT DOCUMENTS

| | | |
|---|---|---|
| 5,386,496 A | 1/1995 | Arai et al. |
| 5,404,432 A | 4/1995 | Koopman et al. |
| | (Continued) | |

FOREIGN PATENT DOCUMENTS

| | | |
|---|---|---|
| CN | 1829326 | 9/2006 |
| CN | 1937748 | 3/2007 |
| | (Continued) | |

OTHER PUBLICATIONS

Corrected Notice of Allowability dated Dec. 15, 2022, from U.S. Appl. No. 17/492,338, 3 pp.
(Continued)

*Primary Examiner* — Amir Shahnami
(74) *Attorney, Agent, or Firm* — Klarquist Sparkman, LLP

(57) ABSTRACT

Innovations in encoding or decoding when switching color spaces are presented. For example, some of the innovations relate to signaling of control information for adaptive color space transformation ("ACT"). Other innovations relate to ACT operations. These innovations can improve coding efficiency when switching between color spaces during encoding and decoding.

20 Claims, 17 Drawing Sheets software 180 implementing one or more innovations for adjustments to encoding and decoding when switching color spaces

Related U.S. Application Data continuation of application No. 15/517,931, filed as application No. PCT/CN2014/088119 on Oct. 8, 2014, now Pat. No. 10,687,069.

(56) References Cited

U.S. PATENT DOCUMENTS

| | | | |
|---|---|---|---|
| 6,198,552 | B1 | 3/2001 | Nagae |
| 6,262,812 | B1 | 7/2001 | Chan et al. |
| 7,209,145 | B2 | 4/2007 | Stevens |
| 7,675,660 | B2 | 3/2010 | Hoshino |
| 10,116,937 | B2 | 10/2018 | Li et al. |
| 10,171,833 | B2 | 1/2019 | Li et al. |
| 10,182,241 | B2 | 1/2019 | Li et al. |
| 10,290,119 | B2 | 5/2019 | White et al. |
| 10,567,769 | B2 | 2/2020 | Li et al. |
| 10,666,972 | B2 | 5/2020 | Li et al. |
| 10,681,375 | B2 | 6/2020 | Li et al. |
| 10,687,069 | B2 | 6/2020 | Li et al. |
| 10,939,110 | B2 | 3/2021 | Li et al. |
| 11,102,496 | B2 | 8/2021 | Li et al. |
| 11,166,042 | B2 | 11/2021 | Li et al. |
| 11,184,637 | B2 | 11/2021 | Li et al. |
| 11,451,778 | B2 | 9/2022 | Li et al. |
| 2001/0038642 | A1 | 11/2001 | Alvarez, II et al. |
| 2006/0210155 | A1 | 9/2006 | Sun |
| 2006/0210156 | A1 | 9/2006 | Lei et al. |
| 2006/0285760 | A1 | 12/2006 | Malvar |
| 2013/0188696 | A1* | 7/2013 | Liu ............... H04N 19/593 375/240.12 |
| 2014/0140404 | A1* | 5/2014 | Liu ............... H04N 19/147 375/240.12 |
| 2015/0304685 | A1 | 10/2015 | Vanam et al. |
| 2015/0326863 | A1 | 11/2015 | Francois et al. |
| 2021/0168366 | A1 | 6/2021 | Li et al. |
| 2021/0352305 | A1 | 11/2021 | Li et al. |
| 2022/0030271 | A1 | 1/2022 | Li et al. |
| 2022/0046276 | A1 | 2/2022 | Li et al. |
| 2022/0394263 | A1 | 12/2022 | Li et al. |

FOREIGN PATENT DOCUMENTS

| | | |
|---|---|---|
| CN | 101160970 | 4/2008 |
| CN | 102223525 | 10/2011 |
| EP | 1977602 | 10/2008 |
| TW | 200838324 | 9/2008 |

OTHER PUBLICATIONS

Notice of Allowance dated Dec. 7, 2022, from U.S. Appl. No. 17/492,338, 10 pp.

Office Action dated Aug. 17, 2022, from U.S. Appl. No. 17/492,338, 12 pp.

Office Action dated Nov. 15, 2022, from U.S. Appl. No. 17/507,519, 20 pp.

Bi, "Color Image Lossless Compression Algorithm Based on YCoCg/YCoCg-R-SPIHT," *Jilin TV & Radio University*, Issue 12, 3 pp. (Dec. 2012).

Notice of Allowance dated Jul. 21, 2021, from U.S. Appl. No. 16/850,847, 8 pp.

Notice of Allowance dated May 12, 2022, from U.S. Appl. No. 17/164,964, 5 pp.

Notice on Grant of Patent dated Apr. 13, 2022, from Chinese Patent Application No. 201811431542.9, 4 pp.

Notice on the First Office Action dated Nov. 3, 2021, from Chinese Patent Application No. 201811431542.9, 22 pp.

Office Action dated Dec. 22, 2021, from U.S. Appl. No. 17/164,964, 11 pp.

Subsequent Substantive Examination Report dated May 19, 2022, from Philippines Patent Applicant No. 1-2016-501641, 3 pp.

Substantive Examination Clear Report (Notice of Allowance) dated Jan. 17, 2022, from Malaysian Patent Application No. PI2016703216, 1 p.

Office Action dated Nov. 21, 2022, from Brazilian Patent Application No. BR122022001585-9, 8 pp.

Notice of Allowance dated Feb. 28, 2023, from U.S. Appl. No. 17/507,519, 7 pp.

\* cited by examiner software 180 implementing one or more
innovations for adjustments to encoding and
decoding when switching color spaces

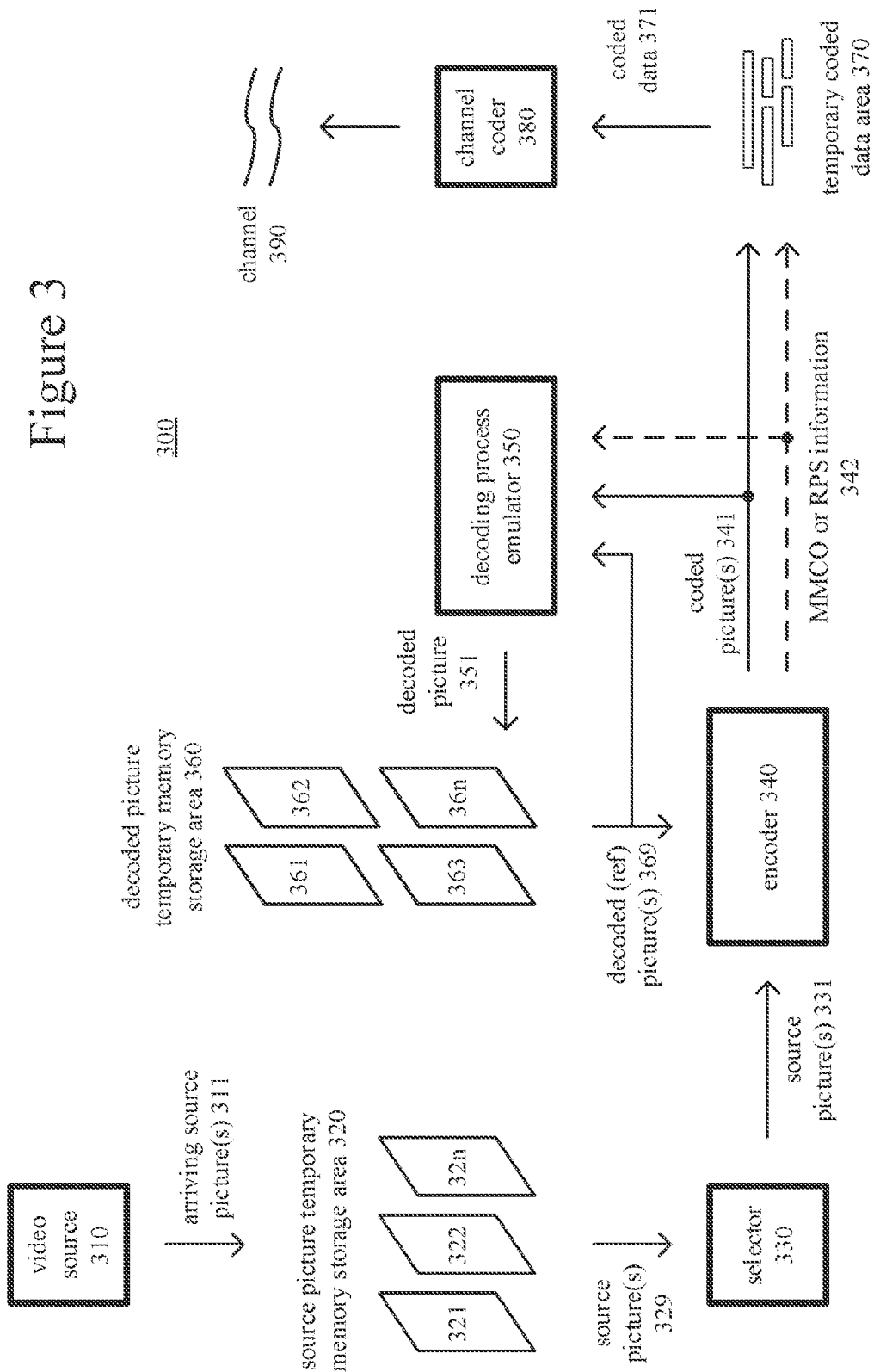

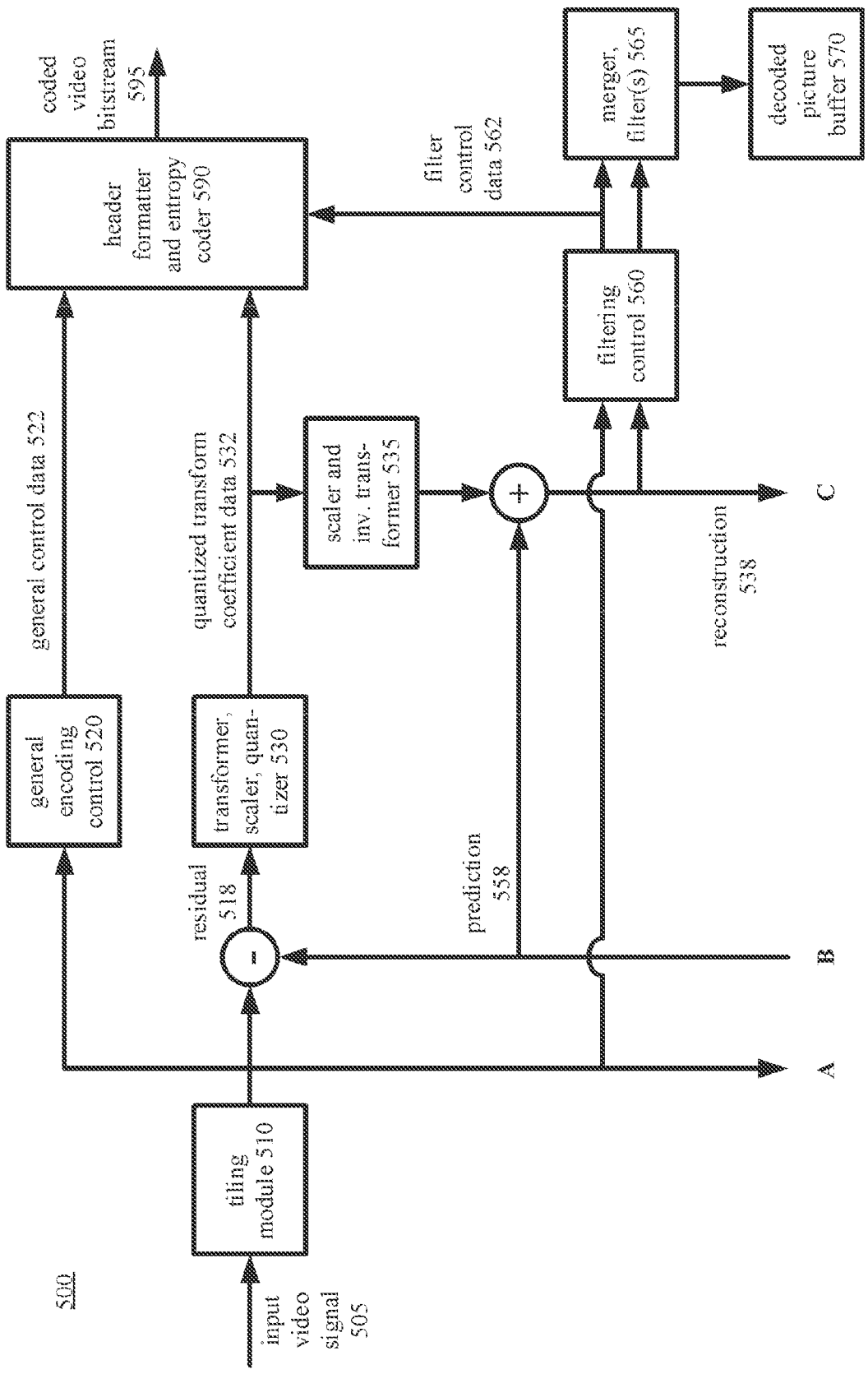

600 computer desktop environment (710) with content that
may provide input for screen capture composite video (820) with natural video
content and palette-based content picture-adaptive color space, color sampling rate and/
or bit depth for pictures in a sequence (900)

slice-adaptive color space, color sampling rate and/or
bit depth for picture (1000) in a sequence CU-adaptive color space, color sampling rate and/or
bit depth for slice (1100) of a picture in a sequence Figure 12   1200
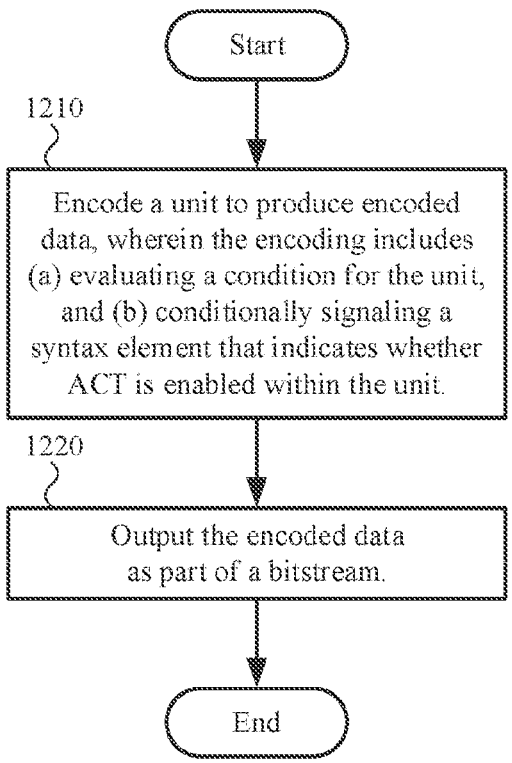
Figure 13   1300
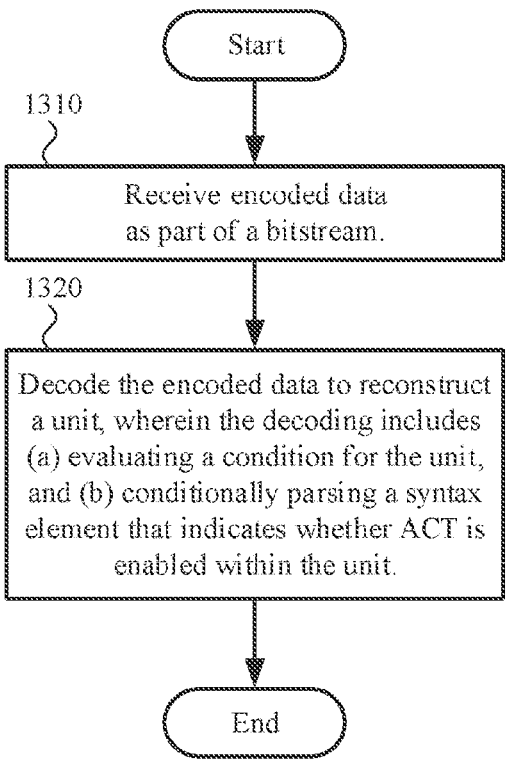
Figure 14   1400
| sps_scc_extensions( ) { | Descriptor |
|---|---|
|   intra_block_copy_enabled_flag | u(1) |
|   palette_mode_enabled_flag | u(1) |
|   if( chroma_format_idc == 3 ) | |
|     residual_adaptive_colour_transform_enabled_flag | u(1) |
| } | |

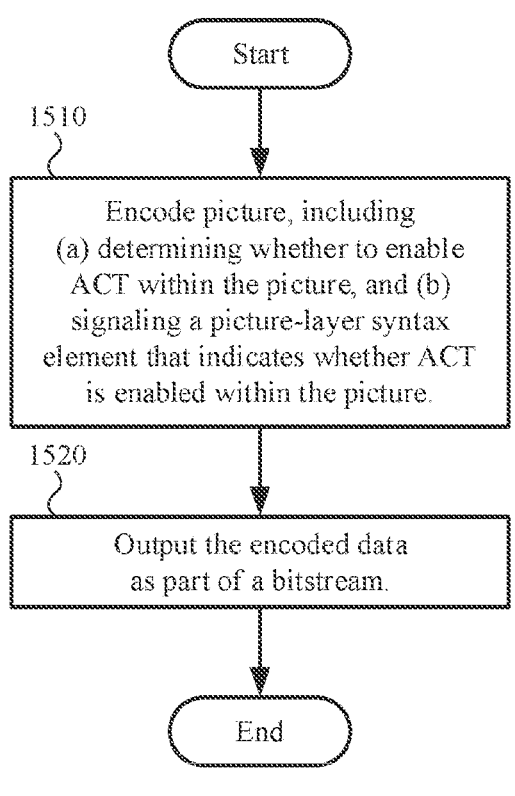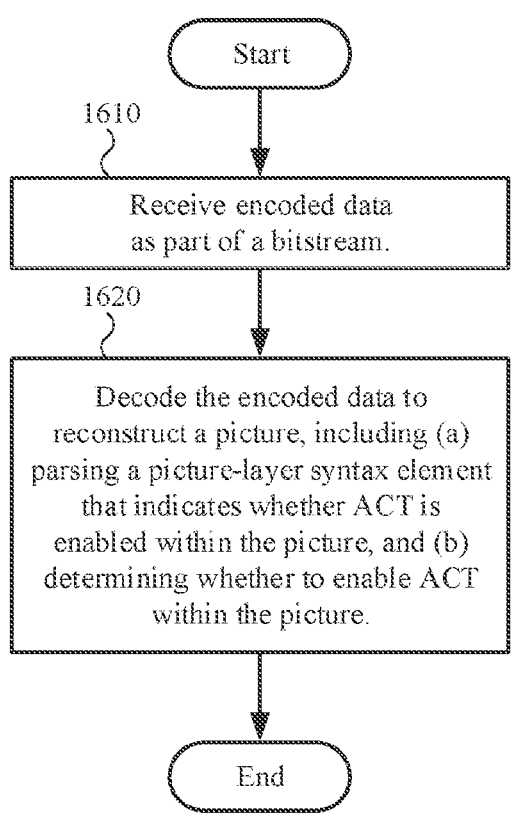

Figure 17a 1700

| pic_parameter_set_rbsp() { | Descriptor |
|---|---|
| ...... | |
| pps_extension_present_flag | u(1) |
| if( pps_extension_present_flag ) { | |
|    pps_range_extensions_flag | u(1) |
|    pps_scc_extensions_flag | u(1) |
|    pps_extension_6bits | u(6) |
| } | |
| if( pps_range_extensions_flag ) | |
|    pps_range_extensions() | |
| if( pps_scc_extensions_flag ) | |
|    pps_scc_extensions() | |
| if( pps_extension_7bits ) | |
|    while( more_rbsp_data() ) | |
|      pps_extension_data_flag | u(1) |
| rbsp_trailing_bits() | |
| } | |

Figure 17b 1710

| pps_scc_extensions() { | Descriptor |
|---|---|
|    residual_adaptive_colour_transform_enabled_flag | u(1) |
| } | |

Figure 18  1800

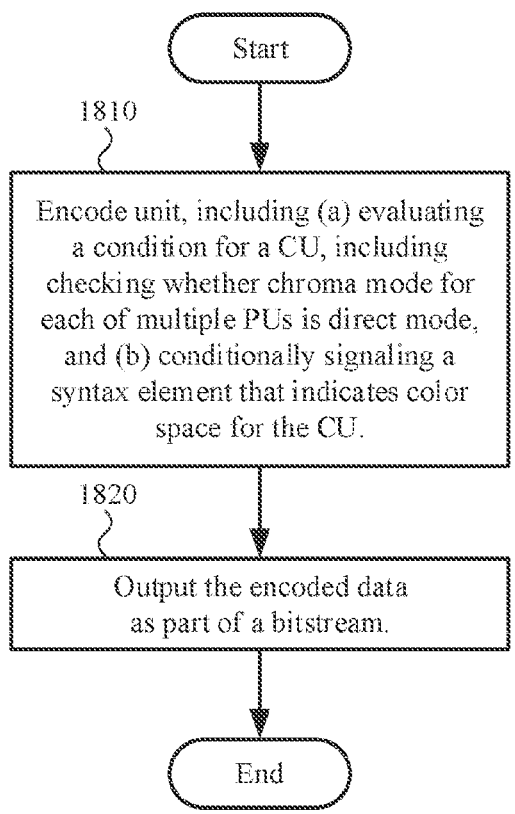

Figure 19  1900

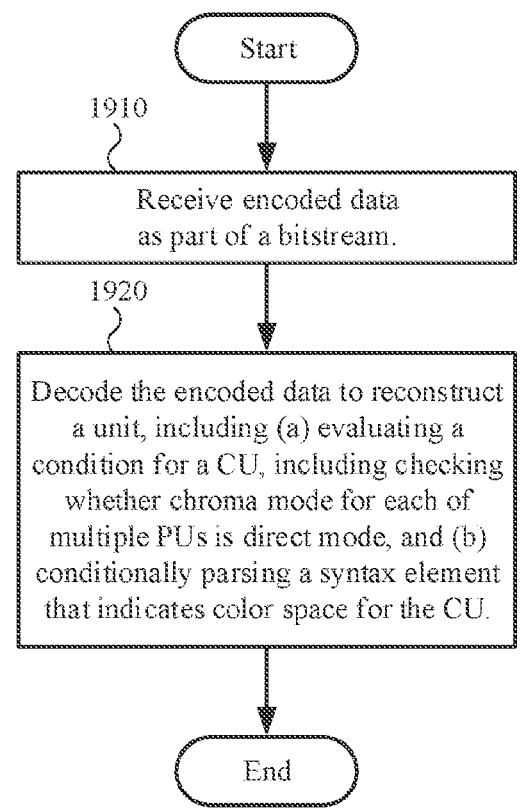

Figure 20  2000

| coding_unit( x0, y0, log2CbSize ) { | Descriptor |
|---|---|
| ...... | |
| if( !pcm_flag[ x0 ][ y0 ] ) { | |
| if( ( CuPredMode[ x0 ][ y0 ] != MODE_INTRA && <br> !( PartMode == PART_2Nx2N && merge_flag[ x0 ][ y0 ] ) ) \|\| <br> ( CuPredMode[ x0 ][ y0 ] == MODE_INTRA && intra_bc_flag[ x0 ][ y0 ] ) ) | |
| rqt_root_cbf | ae(v) |
| if( rqt_root_cbf ) { | |
| if( residual_adaptive_colour_transform_enabled_flag && <br> ( CuPredMode[ x0 ][ y0 ] == MODE_INTER \|\| intra_bc_flag[ x0 ][ y0 ] \|\| <br> (PartMode== PART_2Nx2N && intra_chroma_pred_mode[ x0 ][ y0 ] == 4) <br> \|\| (intra_chroma_pred_mode[ x0 ][ y0 ] == 4 && <br> intra_chroma_pred_mode[ x0+nCbS/2 ][ y0 ] == 4 && <br> intra_chroma_pred_mode[ x0 ][ y0+nCbS/2 ] == 4 && <br> intra_chroma_pred_mode[ x0+nCbS/2 ][ y0+nCbS/2 ] == 4))) | |
| cu_residual_act_flag | |
| ...... | |

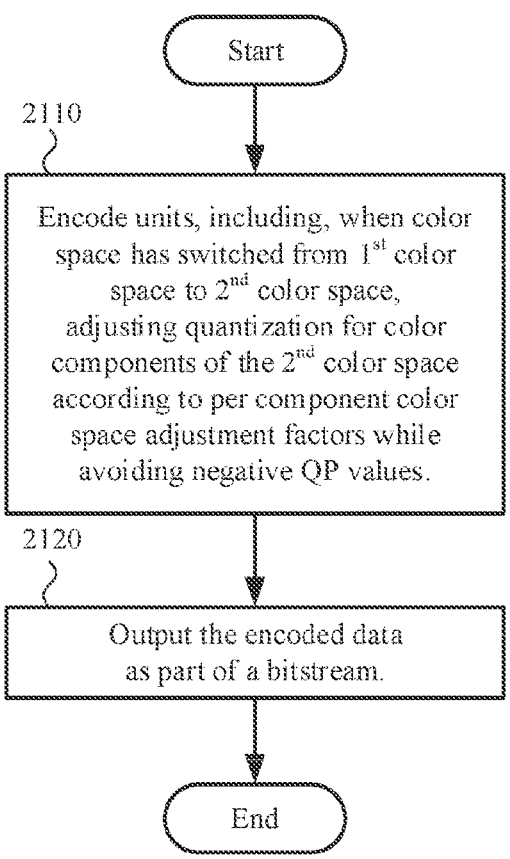
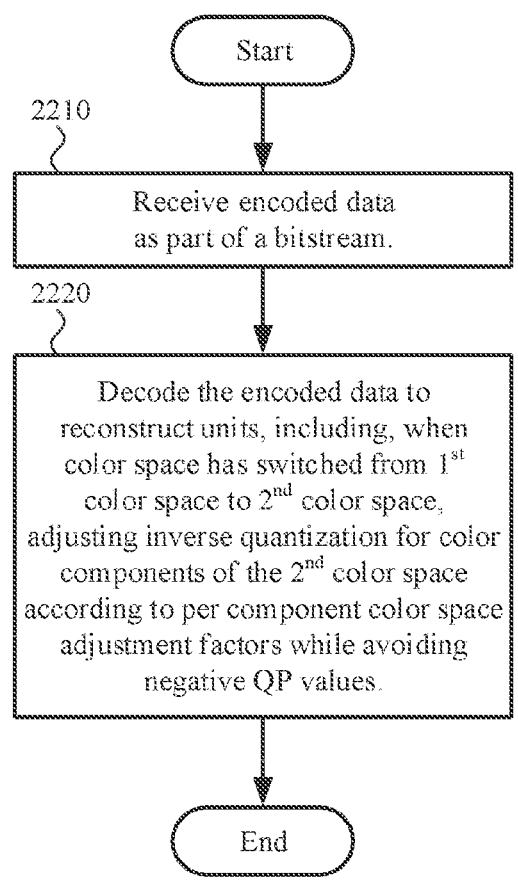

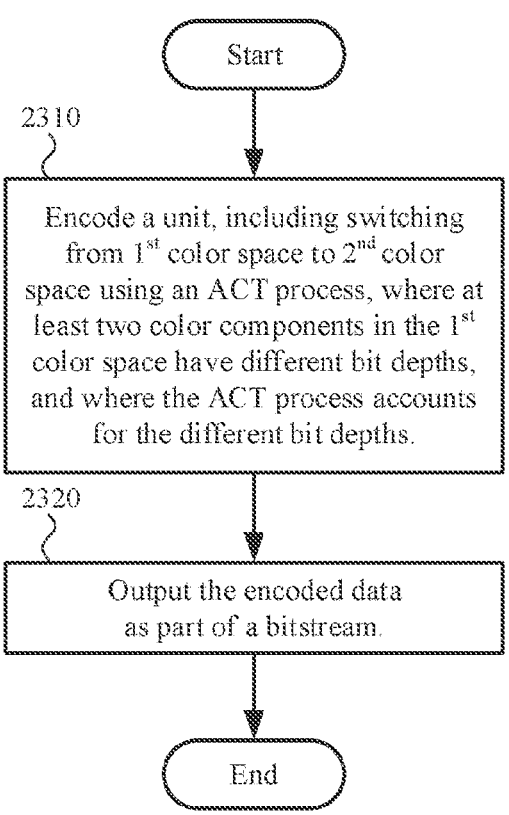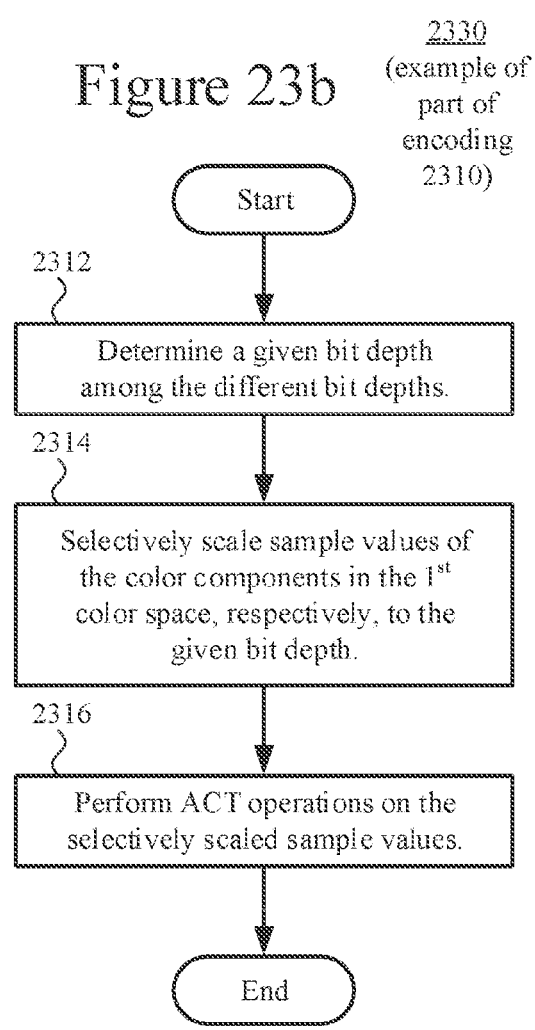

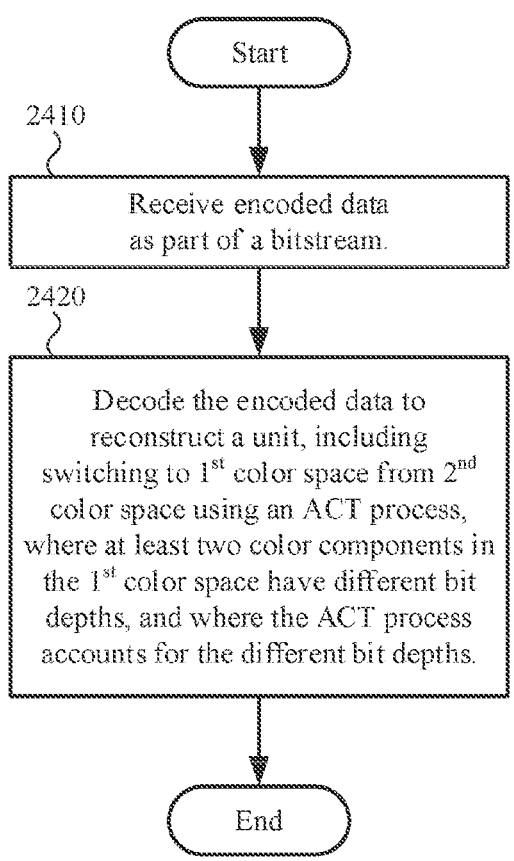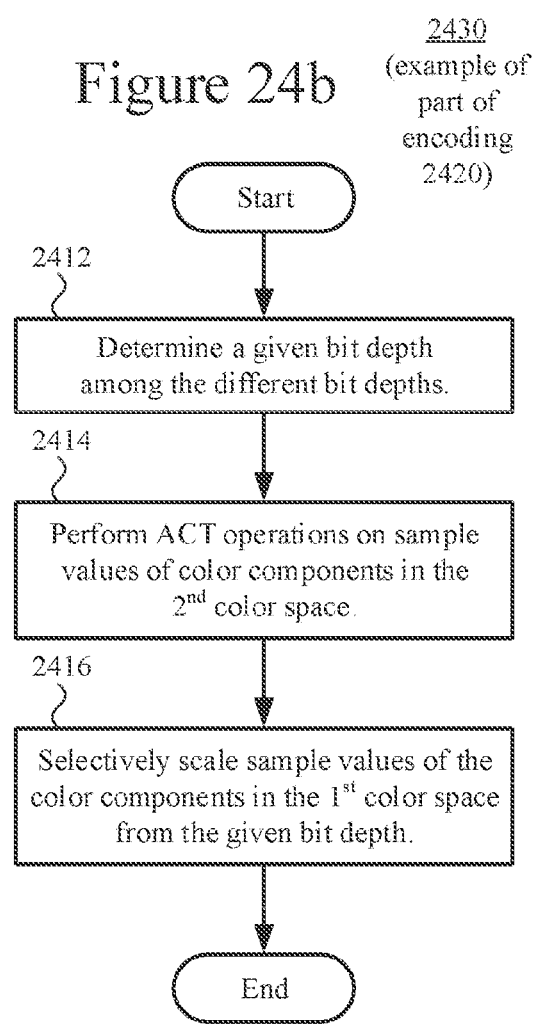

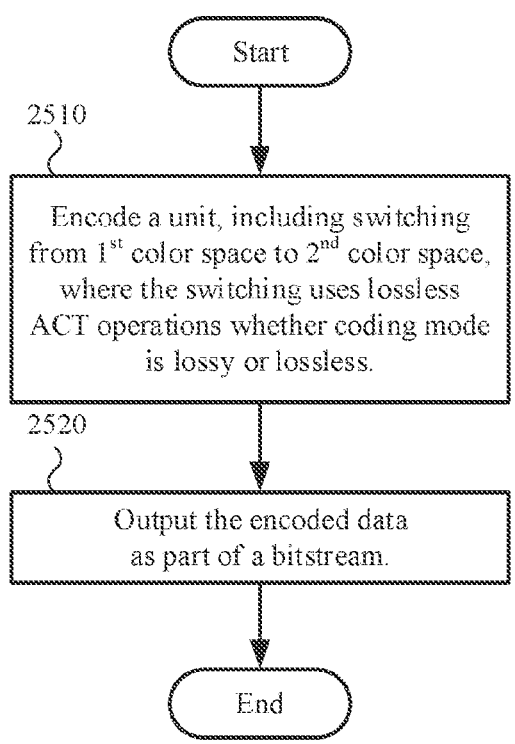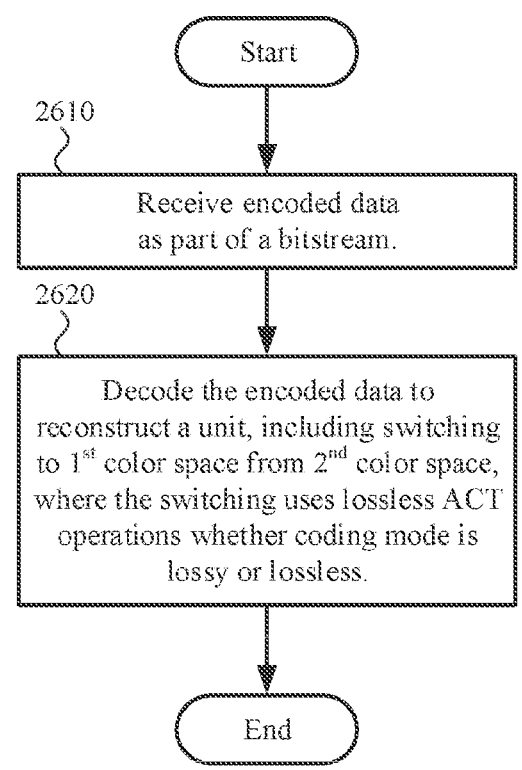

ADJUSTMENTS TO ENCODING AND DECODING WHEN SWITCHING COLOR SPACES

CROSS REFERENCE TO RELATED APPLICATIONS

This application is a continuation of U.S. patent application Ser. No. 16/867,198, filed May 5, 2020, which is a continuation of U.S. patent application Ser. No. 15/517,931, filed Apr. 7, 2017, now U.S. Pat. No. 10,687,069, which is the U.S. National Stage of International Application No. PCT/CN2014/088119, filed Oct. 8, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

A video source such as a camera, animation output, screen capture module, etc. typically provides video in a particular color space. In general, a color space (sometimes called a color model) is a model for representing colors as n values per physical position, for $n \geq 1$, where each of the n values provides a color component value for that position. For example, in a YUV color space, a luma (or Y) component value represents an approximate brightness at a position and multiple chroma (or U and V) component values represent color differences at the position. Or, in an RGB color space, a red (R) component value represents a red intensity, a green (G) component value represents a green intensity, and a blue (B) component value represents a blue intensity at a position. Historically, different color spaces have advantages for different applications such as display, printing, broadcasting and encoding/decoding. Sample values can be converted between color spaces using color space transformation operations.

Many commercially available video encoders and decoders support only a YUV format. Other commercially available encoders and decoders (e.g., for the H.264/AVC standard or H.265/HEVC standard) allow an encoder to specify a color space for a given sequence. The specified color space is used for the entire video sequence. These approaches do not provide sufficient flexibility for a general-purpose codec system that may process very different kinds of video content within a single video sequence. More recently, approaches to switching between color spaces during encoding or decoding have been considered, but these approaches have not addressed various challenges in real-world implementations.

SUMMARY

In summary, the detailed description presents innovations in encoding or decoding when switching color spaces. For example, some of the innovations relate to signaling of control information for adaptive color space transformation ("ACT"). Other innovations relate to ACT operations. These innovations can improve coding efficiency when switching between color spaces during encoding and decoding.

According to one aspect of the innovations described herein, an encoder encodes a unit of an image or video to produce encoded data. As part of the encoding, the encoder evaluates a condition for the unit and conditionally signals a syntax element that indicates whether ACT is enabled within the unit. The syntax element is signaled if the condition is satisfied, but otherwise the signaling of the syntax element is skipped. The encoder outputs the encoded data as part of a bitstream.

A corresponding decoder receives encoded data as part of a bitstream. The decoder decodes the encoded data to reconstruct a unit of an image or video. As part of the decoding, the decoder evaluates a condition for the unit and conditionally parses a syntax element that indicates whether ACT is enabled within the unit. The syntax element is parsed if the condition is satisfied, but otherwise the parsing of the syntax element is skipped.

According to another aspect of the innovations described herein, an encoder encodes a picture of an image or video to produce encoded data. As part of the encoding, the encoder determines whether to enable ACT within the picture, and the encoder signals a picture-layer syntax element that indicates whether ACT is enabled within the picture. The encoder outputs the encoded data as part of a bitstream.

A corresponding decoder receives encoded data as part of a bitstream. The decoder decodes the encoded data to reconstruct a picture of an image or video. As part of the decoding, the decoder parses a picture-layer syntax element that indicates whether ACT is enabled within the picture, and the decoder determines whether to enable ACT within the picture.

According to another aspect of the innovations described herein, an encoder encodes a unit of an image or video to produce encoded data. As part of the encoding, the encoder evaluates a condition for a coding unit ("CU") and conditionally signals a syntax element that indicates color space for the CU. The CU has multiple prediction units ("PUs"). When it evaluates the condition, the encoder checks whether chroma mode for each of the PUs is direct mode. The syntax element is signaled if the condition is satisfied, but otherwise the signaling of the syntax element is skipped. The encoder outputs the encoded data as part of a bitstream.

A corresponding decoder receives encoded data as part of a bitstream. The decoder decodes the encoded data to reconstruct a unit of an image or video. As part of the decoding, the decoder evaluates a condition for a CU and conditionally parses a syntax element that indicates color space for the CU. The CU has multiple PUs. When it evaluates the condition, the decoder checks whether chroma mode for each of the PUs is direct mode. The syntax element is parsed if the condition is satisfied, but otherwise the parsing of the syntax element is skipped.

According to another aspect of the innovations described herein, an encoder encodes units of an image or video to produce encoded data. As part of the encoding, when color space has switched from a first color space to a second color space between two of the units, the encoder adjusts quantization for color components in the second color space according to per component color space adjustment factors while avoiding negative quantization parameter ("QP") values. The encoder outputs the encoded data as part of a bitstream.

A corresponding decoder receives encoded data as part of a bitstream. The decoder decodes the encoded data to reconstruct units of an image or video. As part of the decoding, when color space has switched from a first color space to a second color space between two of the units, the decoder adjusts inverse quantization for color components in the second color space according to per component color space adjustment factors while avoiding negative QP values.

According to another aspect of the innovations described herein, an encoder encodes a unit of an image or video to produce encoded data. The unit includes color components in a first color space, and at least two of the color components in the first color space have different bit depths. As part of the encoding, the encoder switches from the first color space to a second color space using an ACT process that accounts for the different bit depths. The encoder outputs the encoded data as part of a bitstream.

A corresponding decoder receives encoded data as part of a bitstream. The decoder decodes the encoded data to reconstruct a unit of an image or video. The unit includes color components in a first color space, and at least two of the color components in the first color space have different bit depths. As part of the decoding, the decoder switches to the first color space from a second color space using an ACT process that accounts for the different bit depths.

According to another aspect of the innovations described herein, an encoder encodes a unit of an image or video to produce encoded data. As part of the encoding, the encoder switches from a first color space to a second color space. The switching uses lossless ACT operations whether coding mode is lossy or lossless. The encoder outputs the encoded data as part of a bitstream.

A corresponding decoder receives encoded data as part of a bitstream. The decoder decodes the encoded data to reconstruct a unit of an image or video. As part of the decoding, the decoder switches to a first color space from a second color space. The switching uses lossless ACT operations whether coding mode is lossy or lossless.

According to another aspect of the innovations described herein, an encoder encodes a unit of an image or video to produce encoded data. As part of the encoding, when color space has switched from a first color space to a second color space, the encoder predicts residual data values for secondary color components in the second color space using residual data values for a primary color component in the second color space. The prediction process accounts for bit depth of the secondary color components in the second color space and bit depth of the primary color component in the second color space. The encoder outputs the encoded data as part of a bitstream.

A corresponding decoder receives encoded data as part of a bitstream. The decoder decodes the encoded data to reconstruct a unit of an image or video. As part of the decoding, when color space has switched from a first color space to a second color space, the decoder predicts residual data values for secondary color components in the second color space using residual data values for a primary color component in the second color space. The prediction process accounts for bit depth of the secondary color components in the second color space and bit depth of the primary color component in the second color space.

The innovations can be implemented as part of a method, as part of a computing system configured to perform the method or as part of a tangible computer-readable media storing computer-executable instructions for causing a computing system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIGS. 5a and 5b are diagrams illustrating an example video encoder in conjunction with which some described embodiments can be implemented.

FIG. 12 is flowchart illustrating a generalized technique for encoding that includes conditional signaling of a syntax element that indicates whether ACT is enabled.

FIG. 13 is flowchart illustrating a generalized technique for corresponding decoding that includes conditional parsing of the syntax element.

FIG. 14 is a table illustrating an example sequence-layer syntax structure that may include a syntax element that indicates whether ACT is enabled.

FIG. 15 is a flowchart illustrating a generalized technique for encoding that includes picture-layer signaling of a syntax element that indicates whether ACT is enabled.

FIG. 16 is a flowchart illustrating a generalized technique for corresponding decoding that includes parsing of the syntax element.

FIGS. 17a and 17b are tables illustrating example picture-layer syntax structures that include a syntax element that indicates whether ACT is enabled.

FIG. 18 is a flowchart illustrating a generalized technique for encoding that includes conditional signaling of a syntax element that indicates a color space for a CU.

FIG. 19 is a flowchart illustrating a generalized technique for corresponding decoding that includes conditional parsing of the syntax element.

FIG. 20 is a table illustrating an example CU-layer syntax structure that may include a syntax element that indicates a color space for a CU.

FIG. 21 is a flowchart illustrating a generalized technique for encoding that includes adjustment of quantization for color components in a second color space.

FIG. 22 is a flowchart illustrating a generalized technique for corresponding decoding that includes adjustment of inverse quantization.

FIGS. 23a and 23b are flowcharts illustrating a technique for encoding that includes ACT for color components with different bit depths, and FIGS. 24a and 24b are flowcharts illustrating a generalized technique for corresponding decoding that includes ACT for color components with different bit depths.

FIGS. 25 and 26 are flowcharts illustrating generalized techniques for encoding and decoding, respectively, including switching of color spaces using lossless ACT operations whether coding mode is lossy or lossless.

DETAILED DESCRIPTION

Figure 1:
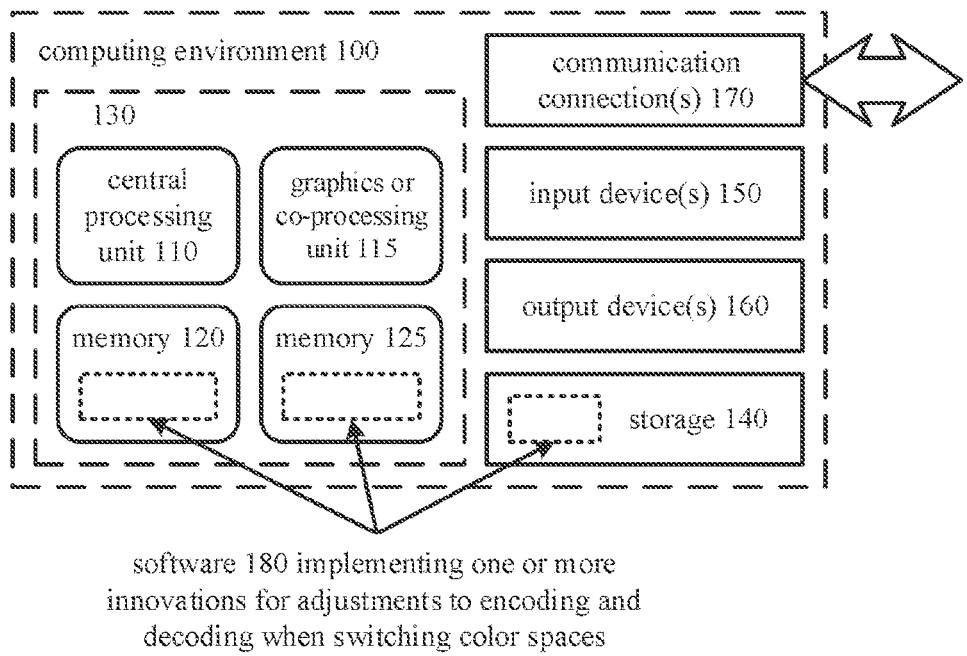
FIG. 1 is a diagram of an example computing system in which some described embodiments can be implemented.

The detailed description presents innovations in encoding or decoding when switching color spaces. For example, some of the innovations relate to signaling of control information for adaptive color space transformation ("ACT"). Other innovations relate to ACT operations. These innovations can improve coding efficiency when switching between color spaces during encoding and decoding.

Although operations described herein are in places described as being performed by a video encoder or video decoder, in many cases the operations can be performed by another type of media processing tool (e.g., image encoder or image decoder). For example, the operations can be performed for applications such as still-image coding or decoding, medical scan content coding or decoding, multi-spectral imagery content coding or decoding, etc.

Some of the innovations described herein are illustrated with reference to terms specific to extensions of the H.265/HEVC standard. For example, reference is made to the draft version JCTVC-R1005 of the screen content coding/decoding extensions for the H.265/HEVC standard—"High Efficiency Video Coding (HEVC) Screen Content Coding: Draft 1," JCTVC-R1005_v2, August 2014. The innovations described herein can also be implemented for other standards or formats.

Many of the innovations described herein can improve rate-distortion performance when encoding certain "artificially-created" video content such as screen capture content. In general, screen capture video (also called screen content video) is video that contains rendered text, computer graphics, animation-generated content or other similar types of content captured when rendered to a computer display, as opposed to camera-captured video content only. Screen capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen capture content include remote desktop conferencing and encoding/decoding of graphical overlays on natural video or other "mixed content" video. Several of the innovations described herein are adapted for encoding of screen content video or other artificially-created video. These innovations can also be used for natural video, but may not be as effective in some cases.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for adjustments to encoding or decoding when switching color spaces, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for adjustments to encoding or decoding when switching color spaces.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
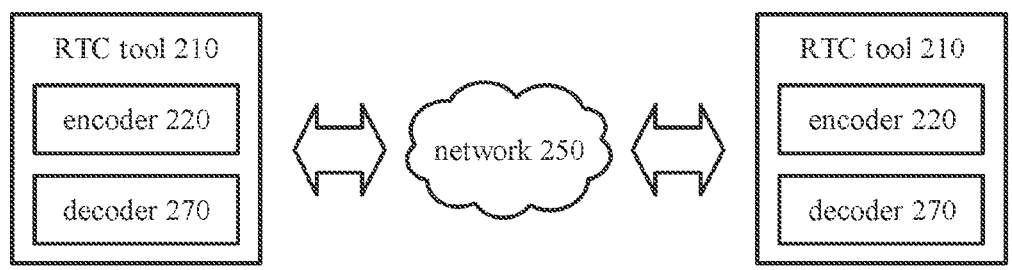
FIGS. 2a and 2b are diagrams of example network environments in which some described embodiments can be implemented.
Figure 2B:
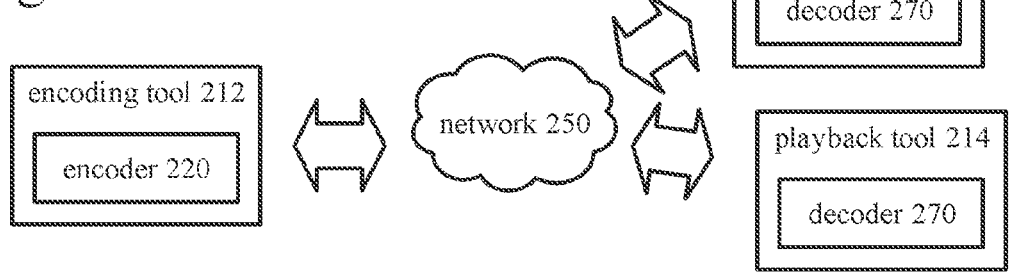

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 4:
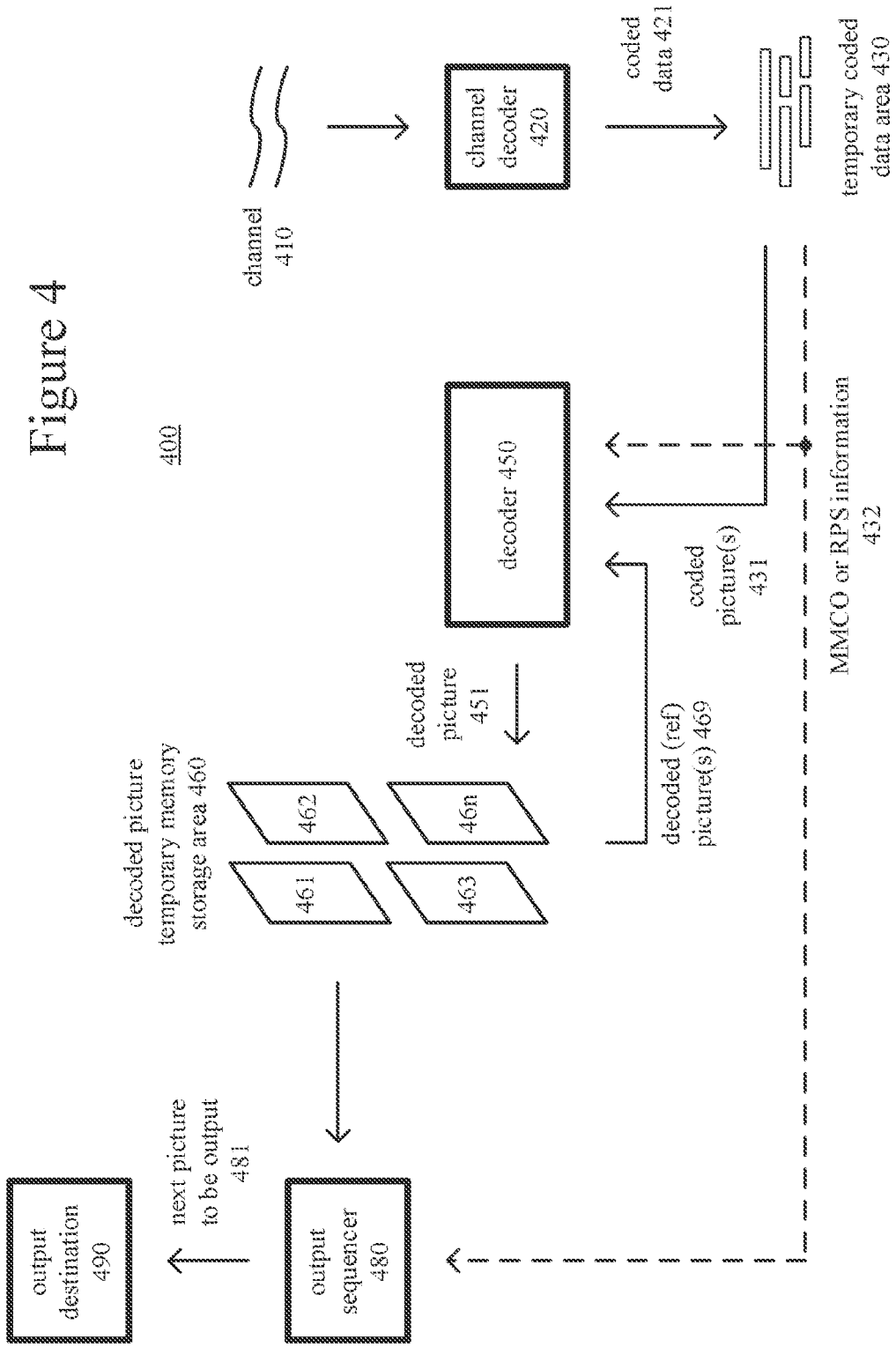
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as part of an operating system module, as part of an application library, as part of a standalone application or using special-purpose hardware. Overall, the encoder system (300) receives a sequence of source video pictures (311) from a video source (310) and produces encoded data as output to a channel (390). The encoded data output to the channel can include content encoded with adaptive switching of color spaces, using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing (e.g., filtering) of the selected picture (331) before encoding. The pre-processing can include color space transformation into primary (e.g., luma) and secondary (e.g., chroma differences toward red and toward blue) components and resampling processing (e.g., to reduce the spatial resolution of chroma components) for encoding. Before encoding, video may be converted to a color space such as YUV, or video may be encoded in another color space (e.g., an RGB-type color space) or switch color spaces during encoding. Chroma sample values may be sub-sampled to a lower chroma sampling rate (e.g., for YUV 4:2:0 format), or the chroma sample values may have the same resolution as the luma sample values (e.g., for YUV 4:4:4 format).

The encoder (340) encodes the selected picture (331) to produce a coded picture (341) and also produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

The encoder (340) accepts video in a particular color space (e.g., a YUV-type color space, an RGB-type color space), with a particular color sampling rate (e.g., 4:4:4) and a particular number of bits per sample (e.g., 12 bits per sample). During encoding, for different pictures, slices, CUs, or other units of video, the encoder (340) can perform adaptive color space transformation ("ACT") to switch between a YUV-type color space and an RGB-type color space, or to/from some other color space. The encoder (340) can also perform ACT to reorder color components, changing which color component is the primary component (e.g., converting between RGB, BGR and GBR formats). In typical implementations, the encoder (340) is adapted to encode the primary component more carefully than the secondary components in various respects (e.g., more options for coding modes, potentially lower quantization step size). By making the color component with the most information content or energy the primary color component, the encoder can improve overall coding efficiency. During encoding, the encoder (340) can also perform resampling processing to change color sampling rates (e.g., between 4:4:4, 4:2:2 and 4:2:0 formats) for different pictures, slices, CUs, or other units of video. The encoder (340) can also change bit depths (e.g., between 12 bits per sample, 10 bits per sample and 8 bits per sample) during encoding for different pictures, slices, CUs, or other units of video, or change bit depths during encoding for different color components of a given picture, slice, or other unit of video. When the encoder (340) switches color spaces during encoding, the encoder (340) can signal information to control ACT operations during decoding, and the encoder (340) can perform ACT operations, using one or more of the innovations described herein.

Generally, the encoder (340) includes multiple encoding modules that perform encoding tasks such as partitioning into tiles, adaptation of color space, color sampling rate and/or bit depth, intra-picture prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, other H.26x format (e.g., H.261, H.262, H.263, H.264), Windows Media Video format, VC-1 format, MPEG-x format (e.g., MPEG-1, MPEG-2, or MPEG-4), or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. In some example implementations, the encoder (340) can switch color spaces, color sampling rates and/or bit depths on a picture-by-picture basis or slice-by-slice basis during encoding.

For syntax according to the H.265/HEVC standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-predicted CU, the PU has the same size as the CU, unless the CU has the smallest size (e.g., 8×8). In that case, the CU can be split into four smaller PUs (e.g., each 4×4 if the smallest CU size is 8×8, for intra-picture prediction) or the PU can have the smallest CU size, as indicated by a syntax element for the CU. For symmetric or asymmetric partitions used in intra BC prediction, however, a larger CU can be split into multiple PUs. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc. In some example implementations, the encoder (340) can switch color spaces, color sampling rates and/or bit depths on a CU-by-CU basis during encoding for CTUs, CUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CB, PB or TB, or some other set of sample values, depending on context. The term "unit" can indicate a picture, slice, macroblock, CTU, CU, PU, TU or some other set of blocks, or it can indicate a single block, depending on context. In some example implementations, the encoder (340) can switch color spaces, color sampling rates and/or bit depths on a unit-by-unit basis during encoding.

Returning to FIG. 3, the encoder represents an intra-coded block of a source picture (331) in terms of prediction from other, previously reconstructed sample values in the picture (331). For intra block copy ("BC") prediction, an intra-picture estimator estimates displacement from a current block to a position in previously reconstructed sample values in the picture. A reference block is a block of sample values in the picture that provide BC-prediction values for the current block. The reference block can be indicated with a block vector ("BV") value (determined in BV estimation). Depending on implementation, the encoder can perform offset estimation for a block using input sample values or reconstructed sample values (previously encoded sample values in the same picture). For intra spatial prediction for a block, the intra-picture estimator estimates extrapolation of the neighboring reconstructed sample values into the block. The intra-picture estimator can output prediction information (such as BV values for intra BC prediction, or prediction mode (direction) for intra spatial prediction), which is entropy coded. An intra-picture prediction predictor applies the prediction information to determine intra prediction values.

For a palette coding mode, the encoder (340) represents at least some of the sample values of a CTU or other unit using a palette. The palette represents colors used in the unit. For example, the palette maps index values 0, 1, 2, . . . , p to corresponding colors. During encoding of the unit, appropriate index values replace sample values at positions in the unit. A rare value in the unit can be encoded using an escape code value and literal values, instead of using an index value in the palette. The palette can change from unit to unit, and information specifying the palettes can be signaled in the bitstream.

The encoder (340) represents an inter-picture coded, predicted block of a source picture (331) in terms of prediction from reference pictures. A motion estimator estimates the motion of the block with respect to one or more reference pictures (369). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. The motion estimator outputs motion information such as motion vector ("MV") information, which is entropy coded. A motion compensator applies MVs to reference pictures (369) to determine motion-compensated prediction values for inter-picture prediction.

The encoder can determine the differences (if any) between a block's prediction values (intra or inter) and corresponding original values. These prediction residual values are further encoded using a frequency transform (if the frequency transform is not skipped), quantization and entropy encoding. For example, the encoder (340) sets values for quantization parameter ("QP") for a picture, tile, slice and/or other portion of video, and quantizes transform coefficients accordingly. For quantization when ACT is used, the encoder (340) can set QP values as described herein. The entropy coder of the encoder (340) compresses quantized transform coefficient values as well as certain side information (e.g., MV information, BV information, palette data, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some implementations, the frequency transform can be skipped. In this case, prediction residual values can be quantized and entropy coded.

An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. In some example implementations, a PPS can include one or more signals indicating a color space, color sampling rate and/or bit depth that apply for a picture (or multiple pictures that use the PPS), as well as other information identifying or defining available color spaces, available color sampling rates and/or available bit depths. In some example implementations, a PPS can include one or more syntax elements that indicate QP values (e.g., an initial QP value for a picture, an initial QP value or offset for a QP value for a second color space). A PPS can be used for a single picture, or a PPS can be reused for multiple pictures in a sequence. A PPS is typically signaled separate from encoded data for a picture (e.g., one network abstraction layer ("NAL") unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use. In some example implementations, an SPS for a sequence can include information identifying or defining available color spaces, available color sampling rates and/or available bit depths, which is referenced when switching color spaces, color sampling rates and/or bit depths within the sequence.

For slice layer, a slice header (e.g., slice segment header) includes values of syntax elements that apply for a slice (e.g., an independent slice segment and any dependent slice segments that follow). In some example implementations, a slice header can include one or more signals indicating a color space, color sampling rate and/or bit depth that apply for a slice. In some example implementations, a slice header can also include information identifying or defining available color spaces, available color sampling rates and/or available bit depths, which is referenced when switching color spaces, color sampling rates and/or bit depths within the slice. In some example implementations, a slice header can include one or more syntax elements for QP values (e.g., an offset for a QP value for a slice, offsets for QP values for color components of the slice, an offset for a second color space, offsets for color components of the second color space). For unit layer (e.g., for a CU), a syntax structure includes values of syntax elements that apply for a unit. In some example implementations, the syntax structure for a unit can include one or more signals indicating a color space, color sampling rate and/or bit depth that apply for the unit, and may also include one or more syntax elements that indicate a QP value that applies for a unit (or QP values that apply for different color spaces for the unit).

The coded pictures (341) and MMCO/RPS information (342) (or information equivalent to the MMCO/RPS information (342), since the dependencies and ordering structures for pictures are already known at the encoder (340)) are processed by a decoding process emulator (350). The decoding process emulator (350) implements some of the functionality of a decoder, for example, decoding tasks to reconstruct reference pictures. In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36*n*). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner. The coded pictures (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as part of an operating system module, as part of an application library, as part of a standalone application or using special-purpose hardware. Overall, the decoder system (400) receives coded data from a channel (410) and produces reconstructed pictures as output for an output destination (490). The received encoded data can include content encoded with adaptive switching of color spaces, color sampling rates and/or bit depths, using one or more of the innovations described herein.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an Internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded pictures (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded picture (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded picture (431) to produce a corresponding decoded picture (451). A picture can be partitioned into multiple tiles of the same size or different sizes. A picture can also be organized as one or more slices. The content of a slice or tile can be further partitioned into blocks or other sets of sample values. As appropriate, when performing its decoding process, the decoder (450) may use one or more previously decoded pictures (469) as reference pictures for inter-picture prediction. The decoder (450) reads such previously decoded pictures (469) from a decoded picture temporary memory storage area (460).

During decoding, for different pictures, slices, CUs, or other units of video, the decoder (450) can perform ACT to switch between a YUV-type color space and an RGB-type color space, or to/from some other color space. The decoder (450) can also perform ACT to reorder color components for different pictures, slices, CUs, or other units of video, changing which color component is the primary component (e.g., converting between RGB, BGR and GBR formats). During decoding, the decoder (450) can also perform resampling processing to change color sampling rates and/or change bit depths for different pictures, slices, CUs, or other units of video. Or, the decoder (450) can change bit depths during decoding for different color components of a given picture, slice, or other unit of video. In some example implementations, the decoder (450) can switch color spaces, color sampling rates and/or bit depths on a picture-by-picture basis during decoding. Alternatively, the decoder (450) can switch color spaces, color sampling rates and/or bit depths on a slice-by-slice basis, CU-by-CU basis or other unit-by-unit basis during decoding. When the decoder (450)

switches color spaces during decoding, the decoder (450) can parse information to control ACT operations during decoding, and the decoder (450) can perform ACT operations, using one or more of the innovations described herein.

Generally, the decoder (450) includes multiple decoding modules that perform decoding tasks such as entropy decoding, intra-picture prediction, motion-compensated inter-picture prediction, inverse quantization, inverse frequency transforms (if not skipped), adaptation of color space, color sampling rate and/or bit depth, and merging of tiles. The exact operations performed by the decoder (450) can vary depending on compression format.

For example, the decoder (450) receives encoded data for a compressed picture or sequence of pictures and produces output including decoded picture (451). In the decoder (450), a buffer receives encoded data for a compressed picture and, at an appropriate time, makes the received encoded data available to an entropy decoder. The entropy decoder entropy decodes entropy-coded quantized data as well as entropy-coded side information, typically applying the inverse of entropy encoding performed in the encoder.

A motion compensator applies motion information to one or more reference pictures to form motion-compensated prediction values for any inter-coded blocks of the picture being reconstructed. An intra-picture prediction module can spatially predict sample values of a current block from neighboring, previously reconstructed sample values. Or, for intra BC prediction, the intra-picture prediction module can predict sample values of a current block using previously reconstructed sample values of a reference block in the picture, which is indicated with a displacement value.

The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. For inverse quantization when ACT is used, the decoder (450) can set QP values as described herein. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-picture predicted block, the decoder (450) combines reconstructed prediction residual values with motion-compensated prediction values. The decoder (450) can similarly combine prediction residual values with prediction values from intra-picture prediction.

For a palette decoding mode, the decoder (450) uses a palette that represents at least some of the sample values of a CTU or other unit. The palette maps index values to corresponding colors. During decoding, for positions in the unit, index values from the palette are replaced with the appropriate sample values. An escape coded value in the unit can be decoded using an escape code value and literal values. The palette can change from unit to unit, and information specifying the palettes can be signaled in the bitstream.

An adaptive deblocking filter is included within the motion compensation loop in the video decoder (450) to smooth discontinuities across block boundary rows and/or columns in the decoded picture (451). Other filtering (such as de-ringing filtering, ALF, or SAO filtering; not shown) can alternatively or additionally be applied as in-loop filtering operations.

The decoded picture temporary memory storage area (460) includes multiple picture buffer storage areas (461, 462, ..., 46n). The decoded picture storage area (460) is an example of a decoded picture buffer. The decoder (450) uses the MMCO/RPS information (432) to identify a picture buffer (461, 462, etc.) in which it can store a decoded picture (451). The decoder (450) stores the decoded picture (451) in that picture buffer.

An output sequencer (480) identifies when the next picture to be produced in output order is available in the decoded picture storage area (460). When the next picture (481) to be produced in output order is available in the decoded picture storage area (460), it is read by the output sequencer (480) and output to the output destination (490) (e.g., display). In general, the order in which pictures are output from the decoded picture storage area (460) by the output sequencer (480) may differ from the order in which the pictures are decoded by the decoder (450).

V. Example Video Encoders

Figure 5B:
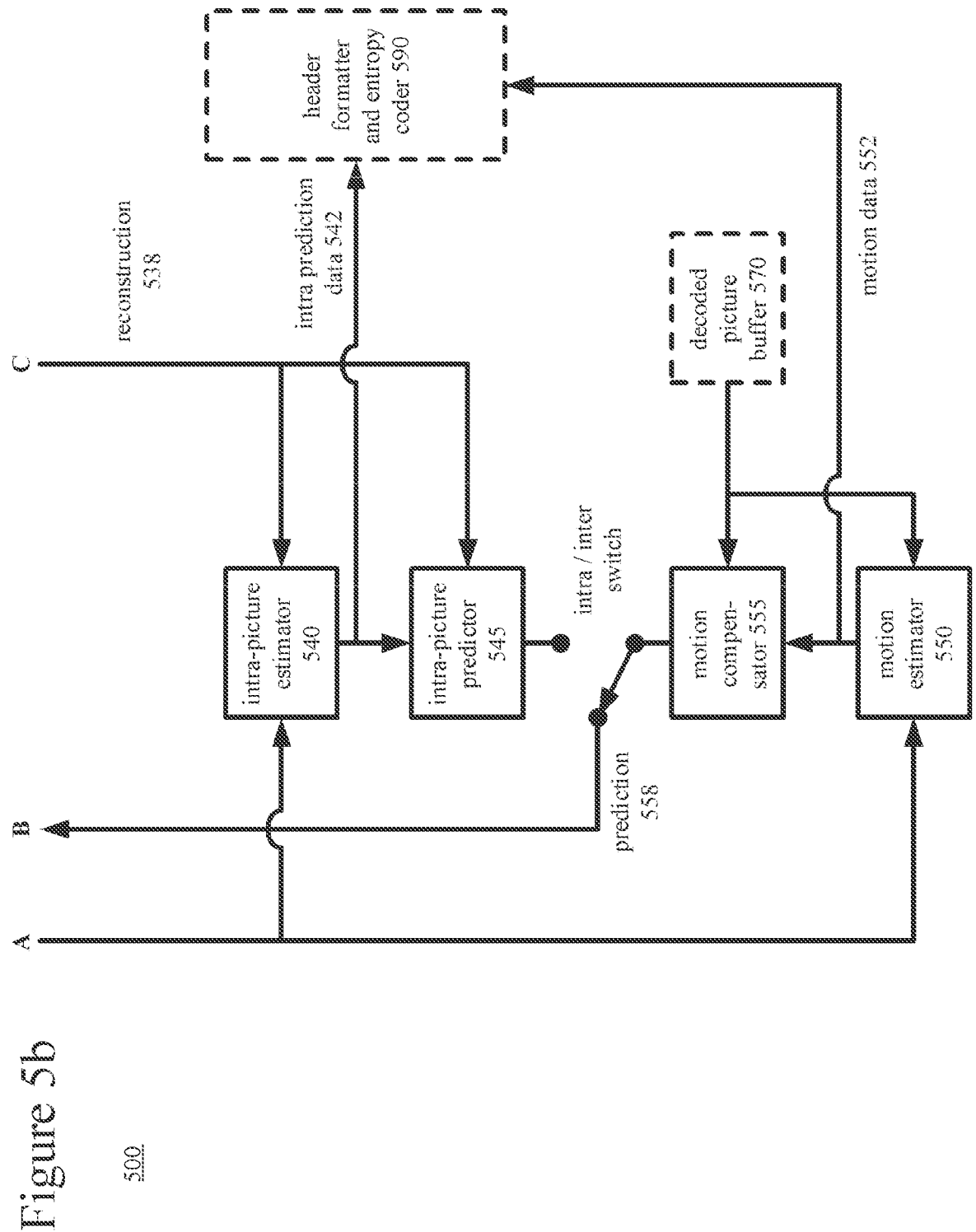

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to adaptively switch color spaces, color sampling rates and/or bit depths during encoding on a picture-by-picture basis, slice-by-slice basis, CU-by-CU basis or other unit-by-unit basis, and can use one or more of the innovations described herein. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of a current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction, the intra-picture estimator (540) estimates displacement from a current block to a reference block, which can be indicated with a BV value.

The intra-picture estimator (540) produces as side information intra prediction data (542), such as information indicating whether intra prediction uses spatial prediction or intra BC prediction, prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of a current block using previously reconstructed sample values of a reference block, which is indicated by a displacement (BV value) for the current block. In some cases, a BV value can be a predicted value. In other cases, the BV value can be different than its predicted value, in which case a differential indicates the difference between the predicted value and BV value.

For a palette coding mode, the encoder (500) represents at least some of the sample values of a CTU or other unit using a palette. The palette represents colors used in the unit. For example, the palette maps index values 0, 1, 2, . . . , p to corresponding colors, which can be in RGB 4:4:4 format, BGR 4:4:4 format, GBR 4:4:4 format or another format (color space, color sampling rate). An index value can represent a RGB triplet, BGR triplet or GBR triplet for a pixel, where a pixel is a set of co-located sample values. For encoding of the unit, index values replace the sample values of pixels in the unit. A rare value in the unit can be encoded using an escape code value and literal values, instead of using an index value in the palette. The palette can change from unit to unit, and palette data specifying the palettes can be signaled in the bitstream.

The intra/inter switch selects whether the prediction (558) for a given block will be a motion-compensated prediction or intra-picture prediction.

In some example implementations, no residual is calculated for a unit encoded in palette coding mode or intra BC prediction mode. Instead, residual coding is skipped, and the predicted sample values are used as the reconstructed sample values. Alternatively, residual coding may be performed even for a unit encoded in palette coding mode or intra BC prediction mode.

When residual coding is not skipped, the difference (if any) between a block of the prediction (558) and a corresponding part of the original current picture of the input video signal (505) provides values of the residual (518). During reconstruction of the current picture, when residual values have been encoded/signaled, reconstructed residual values are combined with the prediction (558) to produce an approximate or exact reconstruction (538) of the original content from the video signal (505). (In lossy compression, some information is lost from the video signal (505).)

As part of residual coding, in the transformer/scaler/quantizer (530), when a frequency transform is not skipped, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The transformer/scaler/quantizer (530) can apply a transform with variable block sizes. In this case, the transformer/scaler/quantizer (530) can determine which block sizes of transforms to use for the residual values for a current block. The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. When ACT is used, the quantizer can set QP values as described herein. The quantized transform coefficient data (532) is provided to the header formatter/entropy coder (590). If the frequency transform is skipped, the scaler/quantizer can scale and quantize the blocks of prediction residual data (or sample value data if the prediction (558) is null), producing quantized values that are provided to the header formatter/entropy coder (590).

To reconstruct residual values, in the scaler/inverse transformer (535), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (500) combines reconstructed residual values with values of the prediction (558) (e.g., motion-compensated prediction values, intra-picture prediction values) to form the reconstruction (538). When residual values have not been encoded/signaled, the encoder (500) uses the values of the prediction (558) as the reconstruction (538).

For intra-picture prediction, the values of the reconstruction (538) can be fed back to the intra-picture estimator (540) and intra-picture predictor (545). The values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax elements within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). The general control data (522) can include signals indicating color spaces, color sampling rates and/or bit depths for pictures, slice, CUs or other units of the video. Such signals can be included, for example, in a PPS, slice header, CU syntax structure or other syntax structure, and can be entropy coded or signaled as fixed length values. The header formatter/entropy coder (590) can also format and/or entropy code information identifying or defining available color spaces (e.g., list of pre-defined color spaces, custom matrices for ACT operations), information identifying or defining available color sampling rates (e.g., list of pre-defined color sampling rates, other color sampling rates, or identification of operations for downsampling and upsampling) and/or information identifying or defining available bit depths (e.g., list of pre-defined bit depths, other bit depths, or identification of operations for bit depth conversion), which is usable by a decoder during adaptive switching. The header formatter/entropy coder (590) can also format and/or entropy code syntax elements that indicate QP values, for example, in a PPS, slice header, CU syntax structure or other syntax structure.

The header formatter/entropy coder (590) provides the encoded data in the coded video bitstream (595). The format of the coded video bitstream (595) can be a variation or extension of H.265/HEVC format, other H.26x format (e.g., 1-1.261, H.262, H.263, H.264), Windows Media Video format, VC-1 format, MPEG-x format (e.g., MPEG-1, MPEG-2, or MPEG-4), or another format.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
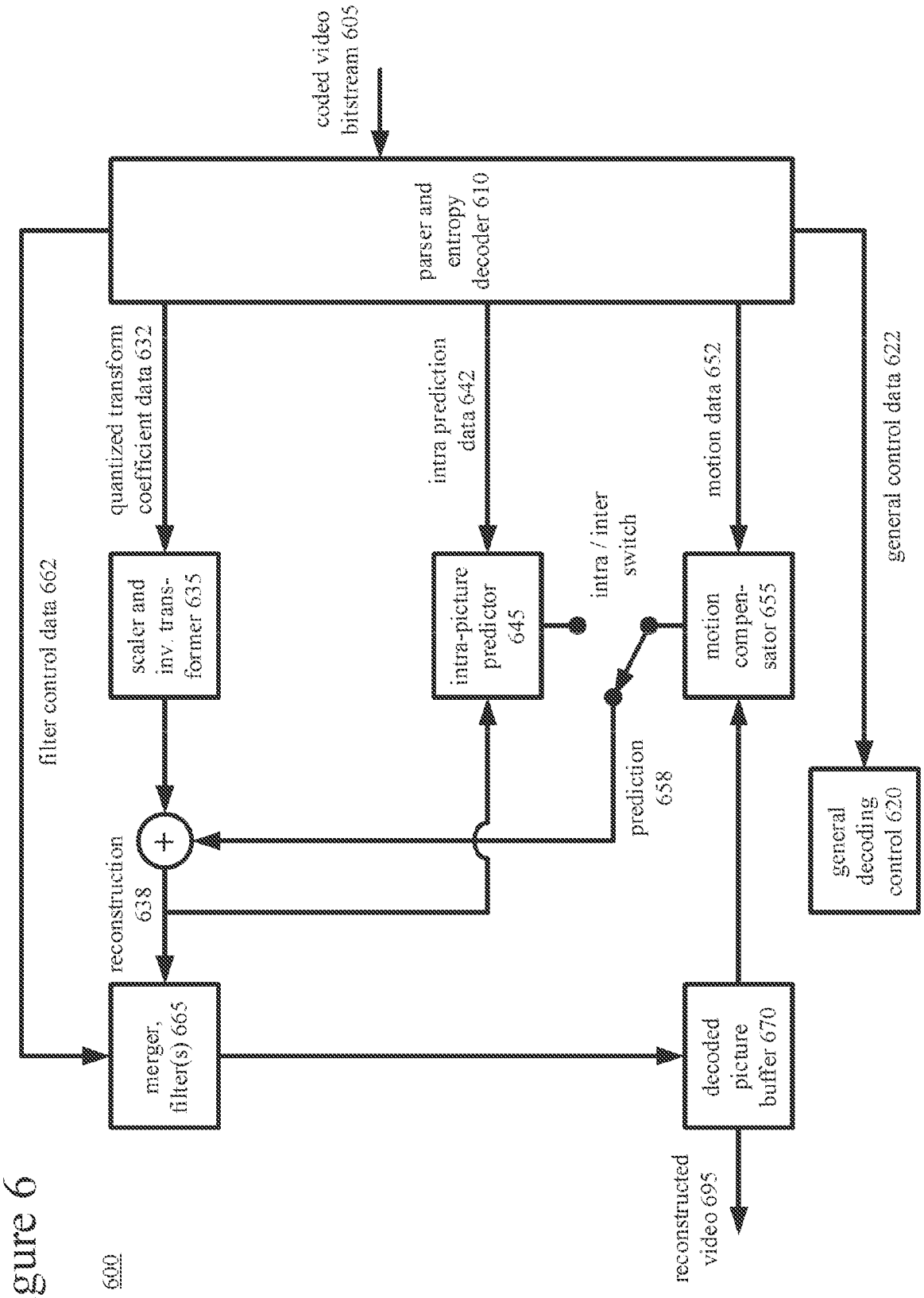
FIG. 6 is a diagram illustrating an example video decoder in conjunction with which some described embodiments can be implemented.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, other H.26x format (e.g., H.261, H.262, H.263, H.264), Windows Media Video format, VC-1 format, MPEG-x format (e.g., MPEG-1, MPEG-2, or MPEG-4), or another format.

A picture can be organized as multiple tiles of the same size or different sizes. A picture can also be organized as one or more slices. The content of a slice or tile can be further organized as blocks or other sets of sample values. The decoder (600) is block-based and uses a block format that depends on implementation. Blocks may be further subdivided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). The general control data (622) includes signals indicating color spaces, color sampling rates and/or bit depths for pictures, slices, CUs, or other units of video. Such signals can be included, for example, in a PPS, slice header, CU syntax structure or other syntax structure, and can be entropy coded or signaled as fixed length values. The parser/entropy decoder (610) can also parse and/or entropy decode information identifying or defining available color spaces (e.g., list of pre-defined color spaces, custom matrices for ACT operations), information identifying or defining available color sampling rates (e.g., list of pre-defined color sampling rates, other color sampling rates, or identification of operations for downsampling and upsampling) and/or information identifying or defining available bit depths (e.g., list of pre-defined bit depths, other bit depths, or identification of operations for bit depth conversion), which is usable by the decoder (600) during adaptive switching. The parser/entropy decoder (610) can also parse and/or entropy decode syntax elements that indicate QP values, for example, from a PPS, slice header, CU syntax structure or other syntax structure.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding. In particular, the general decoding control (620) can cause the decoder (600) to switch color spaces, color sampling rates and/or bit depths during decoding on a picture-by-picture basis, slice-by-slice basis, CU-by-CU basis or some other unit-by-unit basis.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-picture predictor (645) receives the intra prediction data (642), such as information indicating whether intra-picture prediction uses spatial prediction or intra BC prediction, as well as prediction mode direction (for intra spatial prediction) or BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction, the intra-picture predictor (645) predicts the sample values of a current block using previously reconstructed sample values of a reference block, which is indicated by a displacement (BV value) for the current block. In some cases, a BV value (or other offset value) can be a predicted value. In other cases, the BV value (or other offset value) can be different than its predicted value, in which case the BV value (or other offset value) is reconstructed using a differential and the predicted value.

For a palette decoding mode, the decoder (600) uses a palette that represents at least some of the sample values of a CTU or other unit. The palette maps index values to corresponding colors used in the unit. For example, the palette maps index values 0, 1, 2, . . . , p to corresponding colors, which can be in RGB 4:4:4 format, BGR 4:4:4 format, GBR 4:4:4 format or another format (color space, color sampling rate). An index value can represent a RGB triplet, BGR triplet or GBR triplet for a pixel. During decoding, for positions in the unit, index values from the palette are replaced with the appropriate sample values. An escape coded value in the unit can be decoded using an escape code value and literal values. The palette can change from unit to unit, based on palette data signaled in the bitstream.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the decoder (600) combines the prediction (658) with reconstructed residual values to produce the reconstruction (638) of the content from the video signal. When residual values have not been encoded/signaled, the decoder (600) uses the values of the prediction (658) as the reconstruction (638).

To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. When ACT is used, the inverse quantizer can set QP values as described herein. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the decoder (600) or a syntax element within the encoded bitstream data. The decoded picture buffer (670) buffers the reconstructed current picture for use in subsequent motion-compensated prediction.

The decoder (600) can also include a post-processing filter. The post-processing filter (608) can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter (608) is applied to reconstructed sample values outside of the motion compensation loop, before output for display.

Depending on implementation and the type of decompression desired, modules of the decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Adjusting Encoding or Decoding When Switching Color Spaces

This section presents various features of adaptive encoding and decoding for units of a video sequence. A unit can be a picture, slice, CU or other portion of the video sequence. For example, some of the innovations relate to signaling of control information for adaptive color space transformation ("ACT"). Other innovations relate to ACT operations. These features can improve coding efficiency when switching between color spaces during encoding and decoding.

In general, a color space (sometimes called a color model) is a model for representing colors as n values per physical position, for n≥1, where each of the n values provides a color component value for that position. For example, in a YUV color space, a luma (or Y) component value represents an approximate brightness at a position and multiple chroma (or U and V) component values represent color differences at the position. The precise definitions of the color difference values (and transformation operations to/from a YUV color space to another color space such as RGB) depend on implementation. Typically, for purposes of encoding and decoding, the Y component is the primary component, and the U and V components are secondary components. In general, as used herein, the term YUV-type color space indicates any color space with a luma (or luminance) component and one or more chroma (or chrominance) components, including Y'UV, YIQ, Y'IQ and YDbDr as well as variations such as YCbCr, YCgCo and YCoCg. The term YCoCg-type color space indicates any color space with Y, Co and Cg components in any order.

The component signal measures that are used may be adjusted through the application of a non-linear transfer characteristics function (generally known as "gamma pre-compensation" and often denoted by the use of a prime symbol, although the prime symbol is often omitted for typographical convenience). Or, the component signal measures may be in a domain that has a linear relationship with light amplitude. The luma and chroma component signals may be well aligned with the perception of brightness and color for the human visual system, or the luma and chroma component signals may somewhat deviate from such measures (e.g., as in the YCoCg variation, in which formulas are applied that simplify the computation of the color component values).

As another example, in an RGB color space, a red (R) component value represents a red intensity, a green (G) component value represents a green intensity, and a blue (B) component value represents a blue intensity at a position. As used herein, the term RGB-type color space indicates a color space with R, G and B color components in any order. Examples include RGB, BGR and GBR color spaces, which differ in terms of the primary component for purposes of encoding and decoding. The primary component is indicated with the first letter of the color space (e.g., R for RGB).

Color sampling rate (sometimes called chroma sampling rate) refers to the relative spatial resolution between color components. For example, for a color sampling rate of 4:4:4, information for secondary components (e.g., U and V components for YUV) has the same spatial resolution as information for a primary component (e.g., Y component for YUV). For a color sampling rate of 4:2:2 or 4:2:0, information for secondary components is downsampled relative to information for the primary component. A YUV 4:2:0 format is a format that sub-samples chroma information compared to a YUV 4:4:4 format, so that chroma resolution is half that of luma resolution both horizontally and vertically. A YUV 4:2:2 format is a format that sub-samples chroma information horizontally compared to a YUV 4:4:4 format, so that chroma resolution is half that of luma resolution horizontally. Other examples of color sampling rates are 4:1:1 (secondary components have quarter resolution horizontally) and 4:0:0 (secondary components dropped). Color sub-sampling is typically applied to YUV-type color spaces. RGB-type color spaces usually have a color sampling rate of 4:4:4, but can instead have a different color sampling rate according to which secondary color components are sub-sampled.

Although YUV 4:2:0 format is conventionally used for video encoding and decoding, there are some use cases for which video has richer color information, and higher color fidelity may be justified. In such use cases, the differences between YUV 4:4:4 and YUV 4:2:0 chroma sampling formats are more easily perceived by viewers. For example, for encoding/decoding of computer screen text content, animated video content with artificial hard-edged boundaries, or certain features of video content more generally (such as scrolling titles and hard-edged graphics, or video with information concentrated in chroma channels), a 4:4:4 format may be preferable to a 4:2:0 format.

Bit depth refers to the number of bits per sample value. Common bit depths are 8 bits per sample, 10 bits per sample and 12 bits per sample. Other possible bit depths include 4 bits per sample and 16 bits per sample.

Adaptive switching of color spaces, color sampling rates and/or bit depths can improve rate-distortion performance when encoding certain "artificially" created video content such as screen-capture content, or when encoding a mix of natural video and artificially-created video content. Common scenarios for encoding/decoding of screen-capture content include remote desktop conferencing and encoding/decoding of graphical overlays on natural video or other "mixed content" video.

A. Types of Video

Figure 7:
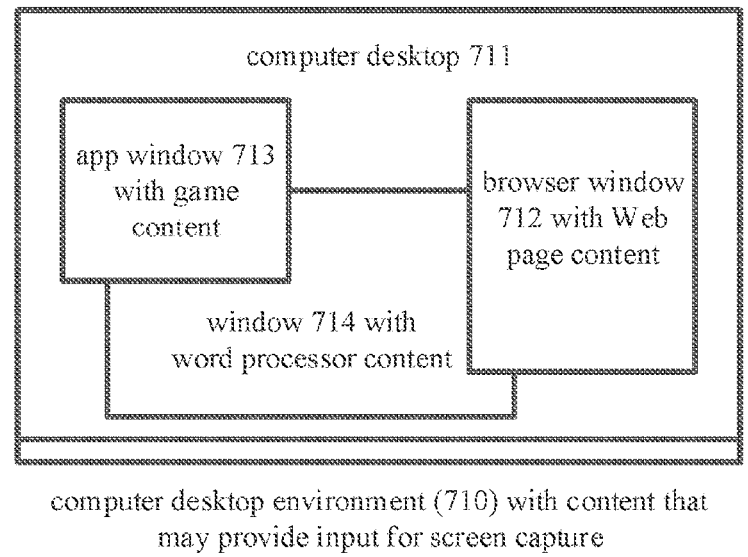
FIG. 7 is diagram illustrating a computer desktop environment with content that may provide input for screen capture.

Screen capture video often represents the output of a computer screen or other display. FIG. 7 shows a computer desktop environment (710) with content that may provide input for screen capture. For example, screen capture video can represent a series of images of the entire computer desktop (711). Or, screen capture video can represent a series of images for one of the windows of the computer desktop environment, such as the app window (713) including game content, browser window (712) with Web page content or window (714) with word processor content.

As computer-generated, artificially-created video content, screen capture content tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from picture-to-picture, even if the content may be spatially displaced (e.g., due to scrolling). Screen capture content is often encoded in a format (e.g., YUV 4:4:4 or RGB 4:4:4) with high chroma sampling resolution, although it may also be encoded in a format with lower chroma sampling resolution (e.g., YUV 4:2:0, YUV 4:2:2).

Figure 8:
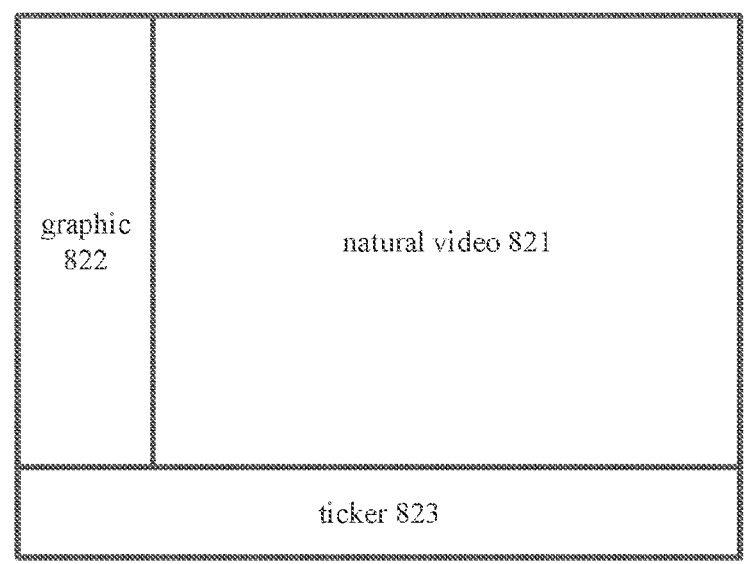
FIG. 8 is a diagram illustrating composite video with natural video content and artificial video content.

FIG. 8 shows composite video (820) that includes natural video (821) and artificially-created video content. The artificially-created video content includes a graphic (822) beside the natural video (821) and ticker (823) running below the natural video (821). Like the screen capture content shown in FIG. 7, the artificially-created video content shown in FIG. 8 tends to have relatively few discrete sample values. It also tends to have distinct structures (e.g., graphics, text characters) that are exactly repeated from picture-to-picture (e.g., due to scrolling).

B. Examples of Adaptive Switching

For adaptive switching of color spaces, different units of video in a sequence are encoded in different color spaces. For example, some of the units are encoded in a YUV-type color space (e.g., YCbCr, a YCoCg-type color space such as YCgCo or YCoCg), and other units are encoded in an RGB-type color space (e.g., RGB, BGR, GBR). In this case, an encoder or decoder, as appropriate, performs ACT operations on sample values to switch between a YUV-type color space and an RGB-type color space. Typically, ACT operations can be represented as matrix multiplication operations performed on a position-by-position basis, where n sample values in a first color space for a position are multiplied by an n×n matrix to produce n sample values in a second color space for the position. In practice, ACT operations can be implemented using other arithmetic.

As another example of adaptive switching of color spaces, different units can be encoded in different RGB-type color spaces, which differ in terms of their primary component and the order that components are signaled (e.g., for residual data). In this case, an encoder or decoder, as appropriate, performs color space reordering operations on blocks or planes of sample values to change which color component is the primary color component.

In some example implementations, for lossy coding mode (in H.265/HEVC implementations, when cu_transquant_bypass_flag equals 0), an encoder can switch between any of the different color spaces. For lossless coding mode (in H.265/HEVC implementations, when cu_transquant_bypass_flag equals 1), however, an encoder only performs invertible color space transformations (e.g., reordering color components between RGB, BGR and GBR color spaces, reordering color components between YCgCo and YCoCg color spaces, or, in some implementations, transformation between an RGB-type color space (such as GBR) and a YCoCg-type color space (such as YCgCo) using an increased intermediate bit depth).

For adaptive switching of color sampling rates, different units of video in a sequence are encoded with different color sampling rates. For example, some of the units are encoded in a 4:2:2 or 4:2:0 format (such as YUV 4:2:2 or YUV 4:2:0), while other units are encoded in a 4:4:4 format (such as YUV 4:4:4). An RGB-type color space usually has a color sampling rate of 4:4:4, but its color components can instead be sub-sampled according to a color sampling rate of 4:2:2 or 4:2:0, e.g., if the primary color component is much more dominant than the secondary color components.

When downsampling sample values for a secondary component horizontally or vertically, an encoder or decoder can perform simple sub-sampling, low-pass filtering plus sub-sampling, or other filtering plus sub-sampling. For corresponding upsampling of the sample values of the secondary component, an encoder or decoder reverses the sub-sampling using, e.g., sample value repetition and/or filtering.

For adaptive switching of bit depths, different units of video in a sequence, or different color components of a unit, are encoded with different bit depths. For example, some of the units are encoded with 12-bit sample values, while other units are encoded with 10-bit sample values or 8-bit sample values. When converting between bit depths, an encoder or decoder can truncate higher-bit-depth sample values (with or without addition of a rounding factor) to produce lower-bit-depth sample values, or scale lower-bit-depth sample values to produce higher-bit-depth sample values.

An encoder typically receives input video in a given format such as RGB 4:4:4 with 12-bit sample values. The encoder can convert between the input format and another format (with a different color space, different color sampling rate and/or different bit depth) for a given unit of the video. Color space adaptation can be performed at picture-level, slice-level, CU-level or some other level, by itself or in combination with color sampling rate adaptation and/or bit depth adaptation. Similarly, color sampling rate adaptation can be performed at picture-level, slice-level, CU-level or some other level, by itself or in combination with color space adaptation and/or bit depth adaptation. Bit depth adaptation can be performed at picture-level, slice-level, CU-level or some other level, by itself or in combination with color space adaptation and/or color sampling rate adaptation.

Figure 9:
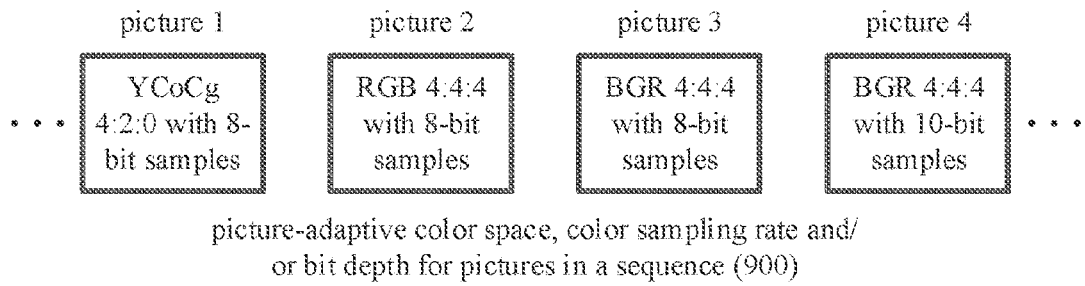
FIG. 9 is a diagram illustrating picture-adaptive color spaces, color sampling rates and/or bit depths for pictures in a sequence.

FIG. 9 shows picture-adaptive color spaces, color sampling rates and/or bit depths for pictures in a sequence (900). The sequence (900) includes a series of pictures. As needed, the encoder converts input video from the input video format to the format selected for a given picture. The format of picture 1 is YCoCg 4:2:0 with 8-bit sample values, and the format of picture 2 is RGB 4:4:4 with 8-bit sample values. Pictures 3 and 4 are BGR 4:4:4 video, but their sample values have different bit depths.

Figure 10:
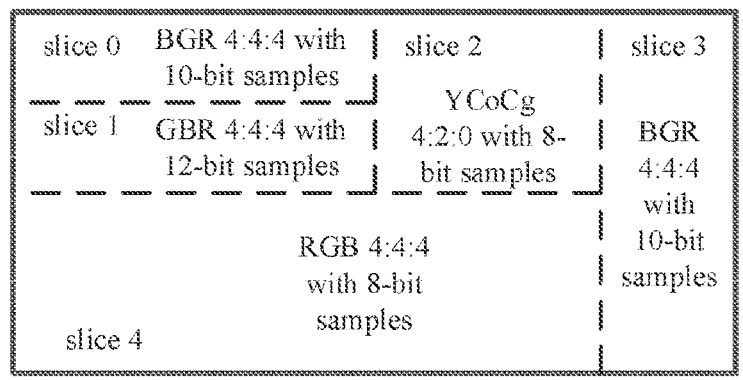
FIG. 10 is a diagram illustrating slice-adaptive color spaces, color sampling rates and/or bit depths for slices of a picture in a sequence.

FIG. 10 shows slice-adaptive color spaces, color sampling rates and/or bit depths for slices of a picture (1000) in a sequence. The picture (1000) includes five slices, whose boundaries are shown in dashed lines. For example, slices 0, 1, 3 and 4 could be associated with screen capture content or other artificially-created video content, while slice 2 is associated with natural video content. The format of slices 0 and 3 is BGR 4:4:4 with 10-bit sample values. Slice 1 includes 12-bit sample values of GBR 4:4:4 video. The format of slice 2 is YCoCg 4:2:0 with 8-bit sample values, and the format of slice 4 is RGB 4:4:4 with 8-bit sample values.

Figure 11:
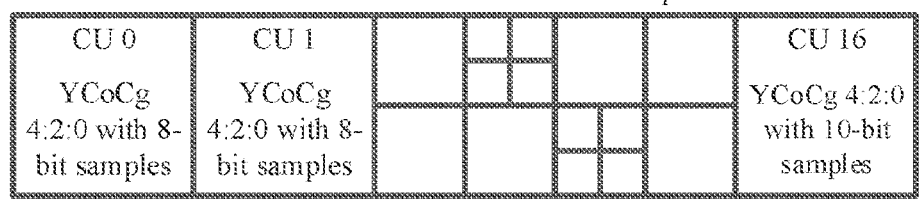
FIG. 11 is a diagram illustrating block-adaptive color spaces, color sampling rates and/or bit depths for blocks of a slice of a picture in a sequence.

FIG. 11 shows CU-adaptive color spaces, color sampling rates and/or bit depths for CUs of a slice (1100) of a picture in a sequence. The slice (1100) includes 17 CUs having three different sizes. The format of the first two CUs is YCoCg 4:2:0 with 8-bit sample values, and the format of the last CU is YCoCg 4:2:0 with 10-bit sample values. CUs 2-15 include 12-bit sample values in an RGB-type color space with a sampling rate of 4:4:4. The color space for CUs 2-15 varies between RGB, BGR and GBR.

C. Example ACT Operations and Adjustments to Quantization/Scaling

When an encoder adaptively switches color spaces between units of video, the encoder can adjust quantization and/or scaling. A corresponding decoder can adjust inverse quantization and/or scaling when the decoder switches color spaces between units of video. For example, the encoder and decoder can use different quantization step sizes for different color components when color space switching happens. Adjusting quantization/scaling during encoding and adjusting inverse quantization/scaling during corresponding decoding can improve coding efficiency when switching between color spaces.

Consider the example of adaptive switching between an RGB-type color space (such as GBR) and a YCoCg-type color space (such as YCgCo) on a unit-by-unit basis. In general, an encoder or decoder can transform sample values from RGB color space to YCoCg color space as shown in the following operation.

$$\begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} / 4$$

The dynamic range of the output sample values in YCoCg color space can be adjusted by adding an offset. For example, suppose the sample values for a position in RGB color space are $Ps_R$, $Ps_G$ and $Ps_B$, respectively, and the current bit depth is $bit\_depth_{current}$. The minimum sample value is 0, and the maximum sample value is $(1 \ll bit\_depth_{current})-1$ (e.g., 255 for 8-bit sample values). The $\ll x$ operation indicates a left bit shift operation by x bits. To adjust the dynamic range of Co and Cg, the term add value is defined as $1 \ll (bit\_depth_{current}-1)$ (e.g., 128 for 8-bit sample values, to keep output values in the range of 0 . . . 255). The sample values $Ps_Y$, $Ps_{Co}$, and $Ps_{Cg}$ for the position in YCoCg color space can be calculated by operations mathematically equivalent to:

$Ps_Y = (Ps_R + (2*Ps_G) + Ps_B + 2) \gg 2$ $Ps_{Co} = ((2*(Ps_R - Ps_B) + 2) \gg 2) + add\_value$ $Ps_{Cg} = (((2*Ps_G) - Ps_R - Ps_B + 2) \gg 2) + add\_value$ where $\gg x$ indicates a right shift operation by x bits. The sample values $Ps_Y$, $Ps_{Co}$, and $Ps_{Cg}$ can be clipped in the range defined by the minimum sample value and maximum sample value.

In general, an encoder or decoder can transform sample values from YCoCg color space back to RGB color space as shown in the following operation.

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}$$

If an offset was added to the sample values in YCoCg color space, the offset is first subtracted. For example, suppose the sample values for a position in YCoCg color space are $Rs_Y$, $Rs_{Co}$ and $Rs_{Cg}$, respectively, and the current bit depth is $bit\_depth_{current}$. To adjust dynamic range, the term add value is defined as $1 \ll (bit\_depth_{current}-1)$ (e.g., 128 for 8-bit sample values, in the range of 0 . . . 255). The sample values $Rs_R$, $Rs_G$, and $Rs_B$ for the position in RGB color space can be calculated by operations mathematically equivalent to:

$Rs_{Co} \mathrel{-}= add\_value$ $Rs_{Cg} \mathrel{-}= add\_value$ $Rs_R = Rs_Y + Rs_{Co} - Rs_{Cg}$ $Rs_G = Rs_Y + Rs_{Cg}$ $Rs_B = Rs_Y - Rs_{Co} - Rs_{Cg}$ The sample values $Rs_R$, $Rs_G$, and $Rs_B$ can be clipped in the range defined by the minimum sample value and maximum sample value. In some implementations, a temporary variable can store the value $Rs_Y - Rs_{Cg}$ for use in the operations.

If the second and third color components of sample values in the YCoCg color space are reordered, the sample values are switched to the YCgCo color space. Similarly, the three color components of sample values in the RGB color space can be reordered to the GBR or BGR color space. In many of the example described below, an encoder and decoder switch between GBR and YCgCo color spaces.

According to the inverse color space transformation matrix, the sample value of the Y component will have an impact on the R, G and B sample values. The total energy contribution for it through the inverse color space transformations is $(1)^2+(1)^2+(1)^2=3$. The sample value of the Co component will have an impact on the R and B sample values, and the total energy contribution for it through the inverse color space transformations is $(1)^2+(0)^2+(-1)^2=2$. Similarly, the sample value of the Cg component will have an impact on the R, G and B sample values, and the total energy contribution for it through the inverse color space transformations is $(-1)^2+(1)^2+(-1)^2=3$. Thus, the ratio of the energy contributions for the Y, Co and Cg components is 3:2:3.

Due to the energy ratio, the energy of quantization error in the Y, Co and Cg components will be amplified by the inverse color space transformations operations. If CUs within a slice or picture have the same QP value, when CUs encoded in YCoCg color space are transformed back to RGB color space, the energy of quantization error for those CUs (coded in the YCoCg domain then transformed back to the RGB domain) will be amplified relative to the energy of quantization error for CUs that were encoded in RGB color space. To have comparable levels of energy of quantization error between the YCoCg-coded CUs and RGB-coded CUs, the encoder and decoder can adjust the QP values or scaling applied to the YCoCg-coded CUs, relative to the QP values or scaling applied to the RGB-coded CUs.

For example, suppose the QP value used for the R, G and B components of an RGB-coded CU of a picture or slice is QP_RGB. For the Y component of a YCoCg-coded CU of the picture or slice, the QP value is QP_Y. For a given value of QP_RGB, the quantization step size QSS is given by $QSS = 2^{(QP\_RGB-4)/6}$. When QP_RGB increases by 1 or decreases by 1, the quantization step size increases or decreases by a factor of $2^{1/6}$. The energy of quantization error for a given QP value can generally be measured as a linear function of $QSS^2$. Thus, for QP_RGB, the energy of quantization error can be measured as $(2^{(QP\_RGB-4/6)})^2 = 2^{(QP\_RGB-4)/3}$. To have comparable levels of energy of quantization error between (a) CUs coded in the RGB domain and (b) CUs coded in the YCoCg domain then transformed back to the RGB domain, the value of QPY is adjusted relative to the value of QP_RGB. Since the energy contribution from the Y component through the inverse color space transformations is $(1)^2+(1)^2+(1)^2=3$, the adjustment is calculated according to the following equations, starting by setting the energy of quantization error for RGB-coded CUs equal to the amplified energy of quantization error for YCoCg CUs.

$2^{(QP\_RGB-4)/3} = 3 * 2^{(QP\_Y-4)/3}$ $\log_2(2^{(QP\_RGB-4)/3}) = \log_2(3) + \log_2(2^{(QP\_Y-4)/3})$ $(QP\_RGB-4)/3 = \log_2(3) + (QP\_Y-4)/3$ $QP\_Y = QP\_RGB - 3 * \log_2(3) = QP\_RGB - 4.755 \approx QP\_RGB - 5$ Thus, the equivalent value of QP_Y can be approximated as the value of QP_RGB−5. Similarly, the values of QP_Co and QP_Cg are adjusted relative to the value of QP_RGB. Since the energy contribution from the Co component through the inverse color space transformations is $(1)^2+(0)^2+(-1)^2=2$, the value of QP_Co is the value of QP_RGB−$3*\log_2(2)$=QP_RGB−3. Like the value of QP_Y, the value of QP_Cg can be approximated as the value of QP_RGB−$3*\log_2(3)$=QP_RGB−4.755 QP_RGB−5. Thus, to compensate for the energy ratio of 3:2:3 when transforming the Y, Co and Cg components back to the RGB domain, the QP values used for the Y, Co and Cg components are approximately −5, −3 and −5 relative to the QP value used for R, G and B components. For example, if QP_RGB is 16, then QP_Y=QP_Cg=11, and QP_Co=13. Or, if QP_RGB is 28, then QP_Y=QP_Cg=23, and QP_Co=25.

An adjustment of −5 to QP value corresponds to scaling by a factor of $2^{5/6}=1.78$. An adjustment of −3 to QP value corresponds to scaling by a factor of $2^{3/6}=1.41$.

If the QP values of R, G, and B components of an RGB-coded CU of a picture or slice are different, the adjustments to QP values or scaling factors for Y, Co, and Cg components can be computed as follows. The QP values of the R, G, and B components are assigned to Y, Co, and Cg components, then adjusted by the QP adjustment factors that are based on energy amplification for the Y, Co and Cg components in the inverse color space transformation operations. For example, suppose QP_R is 19, QP_G is 28, and QP_B is 33. In this case, the encoder and decoder can assign the QP values to first, second and third color components in the same order, then apply the QP value adjustments: QP_Y=19−5=14, QP_Co=28−3=25, and QP_Cg=33−5=28. Or, the encoder and decoder can assign the QP values to first, second and third color components in a different order, then apply the QP value adjustments. E.g., QP_Y=28−5=23, QP_Co=33−3=30, and QP_Cg=19−5=14. Or, the QP value adjustments can depend on only the QP value used for the first color component in the first color space. Or, the QP value adjustments can depend on only the minimum QP value used for the color components of the first color space. Regardless, the energy of the quantization error for RGB-coded CUs (without ACT) is roughly equivalent to the energy of quantization for YCoCg-coded CUs when transformed back to RGB color space.

As noted above, quantization error can generally be modeled as a function of QP value (measuring quantization error as a linear function of $QSS^2$). In particular, this relationship holds for smaller QP values (and QSS). The relationship may not be as accurate for higher QP values, however. Therefore, in some example implementations, an encoder or decoder can use different QP value adjustments for color components in the second color space depending on the QP value(s) of the color components of the first color space. For example, the encoder/decoder can use a lookup table or other structure to determine QP value adjustments for the color components in the second color space depending on the QP values used for the first color space, where the lookup table or other structure associates different QP value adjustments (for the color components of the second color space) with different QP values used for the first color space. The lookup table or other structure can include values for a particular pair of color spaces (first color space, second color space). For example, a lookup table QPAdjustOffset can be organized by color component (component_ID) of the second color space and QP value (QP_CS1) in the first color space.

QPAdjustOffset[component_*ID*][*QP_CS1*]

For a given color component component_ID of the second color space, the lookup table includes QP value adjustments for different QP values QP_CS1 used in the first color space. For a given QP value QP_CS1 used in the first color space and given color component component_ID of the second color space, the encoder/decoder can determine a QP value adjustment to use for that color component component_ID of the second color space.

The encoder and decoder can further adjust the QP values for the color components of the second color space, starting from the QP values of the first, second and third color components for the first color space with QP value adjustments applied. For example, the encoder increases a QP value for one of the color components in the second color space (which increases amplified energy of quantization error), then decreases the QP value for another color component of the second color space to compensate for the increase. Or, the encoder decreases a QP value for one of the color components in the second color space (which decreases amplified energy of quantization error), then increases the QP value for another color component of the second color space to compensate for the decrease. For example, starting from QP_Y=23, QP_Co=30, and QP_Cg=14, the encoder can decrease QP_Y to 18 and increase QP_Cg to 22 without significantly changing the overall energy of quantization error. (The decrease in energy of quantization error of roughly 166 (from changing QP_Y from 23 to 18) is offset by the increase in energy of quantization error of roughly 162 (from changing QP_Cg from 14 to 22).)

An encoder and decoder can similarly determine per color component color space adjustments when switching between other color spaces during encoding or decoding, depending on energy amplification for the respective color components in the second color space in the inverse color space transformations operations. In general, the ACT matrix CC_matrix$_{1\_to\_2}$ for transformation from a first color space to a second color space can be defined as:

$$\begin{bmatrix} c_{00} & c_{01} & c_{02} \\ c_{10} & c_{11} & c_{12} \\ c_{20} & c_{21} & c_{22} \end{bmatrix}$$

To adjust the dynamic range of output, a matrix of offsets CC_offsets$_{1\_to\_2}$ can be used. The offsets CC_offsets$_{1\_to\_2}$ can be defined as:

$$\begin{bmatrix} o_0 \\ o_1 \\ o_2 \end{bmatrix}$$

Suppose the sample values for a position in the first color space are Ps$_{CC1}$=[Ps$_{00}$, Ps$_{01}$, Ps$_{02}$]$^T$. The sample values Ps$_{CC2}$ for the position in the second color space can be calculated as:

$$Ps_{CC2}=CC\_matrix_{1\_to\_2}*Ps_{CC1}+CC\_offsets_{1\_to\_2}$$

The sample values Ps$_{CC2}$ are clipped to the appropriate range.

The ACT matrix CCmatrix$_{2\_to\_1}$ for transformation from a second color space back to a first color space can be defined as:

$$\begin{bmatrix} c'_{00} & c'_{01} & c'_{02} \\ c'_{10} & c'_{11} & c'_{12} \\ c'_{20} & c'_{21} & c'_{22} \end{bmatrix}$$

To adjust the dynamic range of output, a matrix of offsets CCoffsets$_{2\_to\_1}$ can be used. The offsets CC_offsets$_{2\_to\_1}$ can be defined as:

$$\begin{bmatrix} o'_0 \\ o'_1 \\ o'_2 \end{bmatrix}$$

Suppose the sample values for a position in the second color space are Rs$_{CC2}$=[Rs$_{00}$, Rs$_{01}$, Rs$_{02}$]$^T$. The sample values Rs$_{CC1}$ for the position in the first color space can be calculated as:

Rs$_{CC1}$=CC_matrix$_{2\_to\_1}$*(Rs$_{CC2}$+CC_offsets$_{2\_to\_1}$)

The sample values Rs$_{CC1}$ are clipped to the appropriate range.

Per component color space adjustment factors can be determined based on the energy amplification (energy ratio) for the respective color components in the second color space in the inverse color space transformation operations. For example, the total energy contribution for a first component in the inverse color space transformations is cs2to1_0$_{contribution}$=(c'$_{00}$)$^2$+(c'$_{10}$)$^2$ (c'$_{20}$)$^2$. The total energy contribution for a second component is cs2to1_1$_{contribution}$= (c'$_{01}$)$^2$ (c'$_{11}$)$^2$ (C'$_{21}$)$^2$, and the total energy contribution for a third component through the inverse color space transformations is cs2to1_2$_{contribution}$ (c'$_{02}$)$^2$ (c'$_{12}$)$^2$ (C'$_{22}$)$^2$. From these energy contributions, the encoder and decoder can determine adjustments to QP values or scaling factors for the respective components of the second color space, relative to a QP value QP_CS1 for the first color space. The QP value QP_CS2_0 for a first component of the second color space can be determined as QP_CS2_0=QP_CS1-3*log$_2$ (cs2to1_0$_{contribution}$), where -3*log$_2$(cs2to1_0$_{contribution}$) indicates the QP value adjustment. The QP values QP_CS2_1 and QP_CS2_2 for the second and third color components in the second color space can similarly be determined using cs2to1_1$_{contribution}$ and cs2to1_2$_{contribution}$. Alternatively, scaling factors corresponding to the QP value adjustments can be computed.

If the QP values of the color components of the first color space have different values (e.g., QP_CS1_R, QP_CS1_G, QP_CS1_B), the QP values of the color components in the second color space can be assigned as described above, starting from the QP values of the color components of the first color space, and applying the QP value adjustments. After they are assigned and adjusted, the QP values for the color components in the second color space can be increased or decreased as described above, while keeping the level of energy of quantization error roughly the same.

In some example implementations, an encoder assigns QP values to color components of a second color space using syntax elements signaled in a bitstream, and a decoder assigns QP values to the color components in the second color space according to the signaled syntax elements. In these implementations, the encoder has the flexibility to assign a lower QP value to a color component of the second color space that has the highest energy or information content, and assign higher QP values to other color components, or otherwise assign the QP values as the encoder deems to be appropriate.

In other example implementations, an encoder and decoder can derive the QP values according to rules, depending on the identity of the second color space, starting from the QP values of the color components in the first color space. For example, the encoder and decoder assign modified QP values to the color components in the second color space in the order of the QP values for the color components of the first color space. Or, the encoder and decoder assign a lowest QP value, if any, to a first color component of the second color space (e.g., the color component that is expected to have highest energy or information content) and assign the other QP values to the other color components of the second color space. Then, the encoder and decoder adjust the QP values assigned to the color components in the second color space using per component color space adjustment factors determined by rules. For example, the encoder and decoder adjust final QP values or intermediate QP values of color components for the first color space in order to determine the QP values for the color components of the second color space. If the first color space is an RGB-type color space and the second color space is YCoCg, the encoder and decoder can adjust a QP value QP_RGB used for RGB-coded blocks by -5, -3 and -5 for QP values for Y, Co, and Cg components, respectively. More generally, the per component color space adjustment factors can depend on energy amplification for the respective color components in the second color space in inverse color space conversion operations.

For invertible (lossless) color space transformations, an encoder and decoder can reorder color components (e.g., between RGB, BGR and GBR color spaces). The encoder and decoder can also losslessly switch between an RGB-type color space (such as GBR, RGB or BGR) and a YCoCg-type color space (such as YCoCg or YCgCo) using an increased bit depth. For example, the encoder and decoder can switch from the GBR color space to the YCoCg color space. Suppose the sample values for a position in RGB color space are Ps$_R$, Ps$_G$ and Ps$_B$, respectively. The sample values Ps$_Y$, Ps$_{Co}$, and Ps$_{Cg}$ for the position in YCoCg color space can be calculated by operations mathematically equivalent to:

Ps$_{Co}$=Ps$_R$-Ps$_B$ temp=Ps$_B$+(Ps$_{Co}$>>1)

Ps$_{Cg}$=Ps$_G$-temp

Ps$_Y$=temp+(Ps$_{Cg}$>>1)

The encoder and decoder can losslessly switch from the YCoCg color space back to the GBR color space. Suppose the sample values for a position in YCoCg color space are Rs$_Y$, Rs$_{Co}$ and Rs$_{Cg}$, respectively. The sample values Rs$_R$, Rs$_G$, and Rs$_B$ for the position in RGB color space can be calculated by operations mathematically equivalent to:

temp=Rs$_Y$-(Rs$_{Cg}$>>1)

Rs$_G$=Rs$_{Cg}$+temp

Rs$_B$=temp-(Ps$_{Co}$>>1)

Rs$_R$=Ps$_{Co}$Ps$_{Cg}$

If the second and third color components of sample values in the YCoCg color space are reordered, the sample values are switched to the YCgCo color space. Similarly, the three color components of sample values in the RGB color space can be reordered to the GBR or BGR color space. In many of the example described below, an encoder and decoder switch between GBR and YCgCo color spaces. In the case of lossless color space transformations, QP values need not be adjusted to compensate for amplification of error, since sample values are not quantized or inverse quantized.

D. Innovations in Signaling Whether ACT Is Enabled

According to a first set of innovations described herein, an encoder signals a syntax element that indicates whether ACT is enabled. A decoder parses the syntax element that indicates whether ACT is enabled. In one approach, the syntax element is conditionally signaled, for example, for a sequence. In another approach, the syntax element is signaled in a picture-layer syntax structure. Alternatively, the syntax element can be signaled in some other way.

1. Conditional Signaling of Syntax Element

FIG. 12 illustrates a generalized technique (1200) for encoding that includes conditional signaling of a syntax element that indicates whether ACT is enabled. An image encoder or video encoder such as one described with reference to FIG. 3 or FIGS. 5a-5b, or other encoder, can perform the technique (1200). FIG. 13 illustrates a generalized technique (1300) for corresponding decoding that includes conditional parsing of the syntax element. An image decoder or video decoder such as one described with reference to FIG. 4 or FIG. 6, or other decoder, can perform the technique (1300).

With reference to FIG. 12, an encoder encodes (1210) a unit of an image or video to produce encoded data. As part of the encoding (1210), the encoder evaluates a condition for the unit and conditionally signals a syntax element that indicates whether ACT is enabled within the unit. The syntax element is signaled if the condition is satisfied. Otherwise (the condition is not satisfied), the signaling of the syntax element is skipped. The encoder outputs (1220) the encoded data as part of a bitstream.

With reference to FIG. 13, decoder receives (1310) encoded data as part of a bitstream. The decoder decodes (1320) the encoded data to reconstruct a unit of an image or video. As part of the decoding (1320), the decoder evaluates a condition for the unit and conditionally parses a syntax element that indicates whether ACT is enabled within the unit. The syntax element is parsed if the condition is satisfied. Otherwise (the condition is not satisfied), the parsing of the syntax element is skipped (since the syntax element is not present in the bitstream).

For example, the unit is a sequence of video, and the syntax element is a flag value that indicates whether ACT is enabled for the sequence. Alternatively, the unit is another type of unit (e.g., picture) and/or the syntax element is another type of syntax element (e.g., variable length code).

The evaluation of the condition can include checking whether chroma format is 4:4:4. For example, the condition is satisfied if the chroma format is 4:4:4. Otherwise, the condition is not satisfied. Alternatively, the encoder and decoder check another condition.

FIG. 14 illustrates an example sequence-layer syntax structure (1400) that may include a syntax element that indicates whether ACT is enabled. The syntax element residual_adaptive_colour_transform_enabled_flag ("ACT enabled flag") indicates whether ACT is enabled for a sequence. If the value of the ACT enabled flag is 1, ACT may be applied to residual data values. If the value of the ACT enabled flag is 0, ACT is not applied to any residual data values. When not present, the value of the ACT enabled flag is inferred to be 0.

In FIG. 14, the ACT enabled flag is conditionally present or absent depending on the value of the variable chroma_format_idc, which is set before the syntax structure (1400) is processed. The variable chroma_format_idc indicates chroma format (e.g., 4:0:0, 4:2:0, 4:2:2, 4:4:4). In the example shown in FIG. 14, when chroma_format_idc is 3, the chroma format is 4:4:4. Since ACT is designed for use when the chroma format is 4:4:4, the ACT enabled flag is present in the syntax structure (1400) only when the chroma format is 4:4:4.

2. Signaling of Syntax Element at Picture Layer

FIG. 15 illustrates a generalized technique (1500) for encoding that includes picture-layer signaling of a syntax element that indicates whether ACT is enabled. An image encoder or video encoder such as one described with reference to FIG. 3 or FIGS. 5a-5b, or other encoder, can perform the technique (1500). FIG. 16 illustrates a generalized technique (1600) for corresponding decoding that includes parsing of the syntax element. An image decoder or video decoder such as one described with reference to FIG. 4 or FIG. 6, or other decoder, can perform the technique (1600).

With reference to FIG. 15, an encoder encodes (1510) a picture of an image or video to produce encoded data. As part of the encoding (1510), the encoder determines whether to enable ACT within the picture and signals a picture-layer syntax element that indicates whether ACT is enabled within the picture. The encoder outputs (1520) the encoded data as part of a bitstream.

With reference to FIG. 16, a decoder receives (1610) encoded data as part of a bitstream. The decoder decodes (1620) the encoded data to reconstruct a picture of an image or video. As part of the decoding (1620), the decoder parses a picture-layer syntax element that indicates whether ACT is enabled within the picture, and the decoder determines whether to enable ACT within the picture.

For example, the picture-layer syntax element can be signaled as part of a PPS syntax structure that is used for the picture. The PPS syntax structure is separate from slice data for the picture. In some implementations, the picture-layer syntax element is a flag in a PPS extensions syntax structure within the PPS syntax structure. Alternatively, the picture-layer syntax element is signaled in another picture-layer syntax structure and/or is signaled using another type of syntax element (e.g., variable length code).

FIGS. 17a and 17b are tables illustrating example picture-layer syntax structures that include a picture-layer syntax element that indicates whether ACT is enabled. In particular, FIG. 17a shows a PPS syntax structure (1700) that may includes a PPS extensions syntax structure (1710) (that is, a pps_scc_extensions( ) structure), whose presence is indicated by the pps_extension_present_flag syntax element. FIG. 17b shows the PPS extensions syntax structure (1710), which includes the residual_adaptive_colour_transform_enabled_flag syntax element ("ACT enabled flag"). The ACT enabled flag indicates whether ACT is enabled for a picture (or pictures) associated with the PPS syntax structure (1700) (and hence associated with the PPS extensions syntax structure (1710)). If the value of the ACT enabled flag is 1, ACT may be applied to residual data values for the picture(s). If the value of the ACT enabled flag is 0, ACT is not applied to any residual data values for the picture(s). When not present, the value of the ACT enabled flag is inferred to be 0. The value of the ACT enabled flag can be constrained (for purposes of bitstream conformance) such that, when the chroma format is not 4:4:4, the value of the ACT enabled flag is 0.

E. Innovations in Signaling Color Space Flags

According to a second set of innovations described herein, an encoder conditionally signals a syntax element that indicates a color space for a CU. A decoder conditionally parses a syntax element that indicates a color space for a CU. In particular, the encoder and decoder evaluate a condition that depends on chroma mode of multiple PUs of the CU.

FIG. 18 illustrates a generalized technique (1800) for encoding that includes conditional signaling of a syntax element that indicates a color space for a CU. An image encoder or video encoder such as one described with reference to FIG. 3 or FIGS. 5a-5b, or other encoder, can perform the technique (1800). FIG. 19 illustrates a generalized technique (1900) for corresponding decoding that includes conditional parsing of the syntax element. An image decoder or video decoder such as one described with reference to FIG. 4 or FIG. 6, or other decoder, can perform the technique (1900).

With reference to FIG. 18, an encoder encodes (1810) a unit of an image or video to produce encoded data. As part of the encoding (1810), the encoder evaluates a condition for a CU and conditionally signals a syntax element that indicates color space for the CU. The CU has multiple PUs (e.g., 4 PUs). When it evaluates the condition, the encoder checks whether chroma mode for each of the PUs is direct mode. The syntax element is signaled if the condition is satisfied. Otherwise (the condition is not satisfied), the signaling of the syntax element is skipped. The encoder outputs (1820) the encoded data as part of a bitstream.

With reference to FIG. 19, a decoder receives (1910) encoded data as part of a bitstream. The decoder decodes (1920) the encoded data to reconstruct a unit of an image or video. As part of the decoding (1920), the decoder evaluates a condition for a CU and conditionally parses a syntax element that indicates color space for the CU. The CU has multiple PUs (e.g., 4 PUs). When it evaluates the condition, the decoder checks whether chroma mode for each of the PUs is direct mode. The syntax element is parsed if the condition is satisfied. Otherwise (the condition is not satisfied), the parsing of the syntax element is skipped (since the syntax element is not present in the bitstream).

The coding mode of the CU can be intra-picture prediction (spatial prediction). In this case, direct mode indicates that a prediction direction for a primary color component is also used for secondary color components. (If different color components of a PU have different prediction directions, ACT operations on the residual data values in the different color components are not likely to be helpful. On the other hand, if the different color components of the PU have the same prediction direction, ACT operations on the residual data values in the different color components may be helpful.) A syntax element for chroma mode of a PU can indicate whether the chroma mode of the PU is direct mode or some specified prediction direction(s) for the secondary color components. Alternatively, a syntax element for a PU can indicate whether chroma mode of the PU is direct mode or not direct mode, in which case another syntax element may specify the prediction direction(s) for the secondary color components.

The syntax element that indicates color space for the CU can be a flag value that indicates a selection between first color space (such as GBR) and second color space (such as YCgCo) for the CU. The selection of the first color space can be implied for the CU if the syntax element is not present in the bitstream. Alternatively, the syntax element is another type of syntax element (e.g., variable length code indicating a selection from among multiple available color spaces).

When it evaluates the condition, the encoder or decoder can also check other sub-conditions. For example, the encoder or decoder checks whether the CU has residual data values. In some example implementations, ACT is only performed if the CU has residual data values. As another example, the encoder or decoder checks whether ACT is enabled (e.g., according to the value of an ACT enabled flag as described in the previous section). (If ACT is not enabled, no syntax element need be signaled to indicate color space for the CU.) As another example, the encoder or decoder checks whether coding mode of the CU is inter-picture prediction or intra-picture BC prediction. (In these example implementations, different color components of a CU encoded with inter-picture prediction or intra-picture BC prediction use the same MV value or BV value, so ACT operations on the residual data values in the different color components may be helpful.) For a CU with a single PU, the encoder or decoder can also check whether chroma mode for that single PU is direct mode. Thus, for example, the condition is satisfied if: (a) the CU has residual data, (b) ACT is enabled, and (c) the coding mode of the CU is inter-picture prediction, the coding mode of the CU is intra-picture block copy prediction, or the (the coding mode being intra spatial prediction) chroma mode for any PU(s) of the CU is direct mode. Otherwise, the condition is not satisfied.

FIG. 20 illustrates an example CU-layer syntax structure (2000) that may include a syntax element cu_residual_act_flag ("ACT flag"), which indicates a color space for a CU. In the CU-layer syntax structure (2000), the rqt_root_cbf syntax element indicates whether residual data (specifically, a transform_tree( ) syntax structure) is present for the CU. If rqt_root_cbf is non-zero, residual data is present. Otherwise (rqt_root_cbf is 0), residual data is not present. If residual data is present (rqt_root_cbf is non-zero), then the ACT flag may also be present. Specifically, the ACT flag is present if:

(1) residual_adaptive_colour_transform_enabled_flag ("ACT enabled flag") equals 1; AND
(2) (a) coding mode of the CU is inter prediction mode (MODE_INTER),
 (b) coding mode of the CU is intra BC prediction (intra_bc_flag[x0][y0] is 1),
 (c) coding mode of the CU is intra prediction (spatial), and the CU has a single PU (PartMode is PART_2N×2N) whose chroma mode is direct mode (intra_chroma_pred_mode is 4),
 OR
 (d) coding mode of the CU is intra prediction (spatial), and chroma mode of each of the four PUs of the CU (PartMode is PART_N×N) is direct mode (intra_chroma_pred_mode is 4).

When the value of the ACT flag is 1, ACT operations are applied to residual data values of the CU, switching the color space from the first color space (e.g., GBR) to the second color space (e.g., YCgCo). When the value of the ACT flag is 0 or the ACT flag is not present, ACT operations are not applied to residual data values of the CU, so the residual data values stay in the first color space.

Alternatively, the ACT flag for a CU or other unit can be signaled in some other way.

F. Innovations in Adjusting Quantization/Scaling When Switching Color Spaces According to a third set of innovations described herein, an encoder adjusts quantization for color components in a second color space according to per component color space adjustment factors, while avoiding negative QP values. A decoder adjusts inverse quantization for color components in the second color space according to per component color space adjustment factors, while avoiding negative QP values. In one approach, the encoder or decoder uses clipping to avoid negative QP values. In another approach, the encoder or decoder uses positive values for the adjustment factors, which compensate for an increase in bit depth for sample values in the second color space due to ACT operations.

FIG. 21 illustrates a generalized technique (2100) for encoding that includes adjustment of quantization for color components in a second color space according to adjustment factors, while avoiding negative QP values. An image encoder or video encoder such as one described with reference to FIG. 3 or FIGS. 5a-5b, or other encoder, can perform the technique (2100). FIG. 22 illustrates a generalized technique (2200) for corresponding decoding that includes adjustment of inverse quantization for color components in the second color space according to adjustment factors, while avoiding negative QP values. An image decoder or video decoder such as one described with reference to FIG. 4 or FIG. 6, or other decoder, can perform the technique (2200).

With reference to FIG. 21, an encoder encodes (2110) units (e.g., CUs, slices, pictures) of an image or video to produce encoded data. As part of the encoding (2110), when color space has switched from a first color space to a second color space between two of the units (e.g., from an RGB-type color space to a YUV-type color space), the encoder adjusts quantization for color components in the second color space according to per component color space adjustment factors, while avoiding negative QP values. The encoder outputs (2120) the encoded data as part of a bitstream.

With reference to FIG. 22, a decoder receives (2210) encoded data as part of a bitstream. The decoder decodes (2220) the encoded data to reconstruct units (e.g., CUs, slices, pictures) of an image or video. As part of the decoding (2220), when color space has switched from a first color space to a second color space between two of the units (e.g., from an RGB-type color space to a YUV-type color space), the decoder adjusts inverse quantization for color components in the second color space according to per component color space adjustment factors, while avoiding negative QP values.

In one approach, for intermediate or final QP values for color components in the second color space that have been adjusted according to the adjustment factors, the encoder or decoder avoids negative QP values by clipping the intermediate or final QP values at zero. For example, if the first color space is an RGB-type color space (such as GBR) and the second color space is a YCoCg-type color space (such as YCgCo), the adjustment factors can be −5, −5 and −3 for Y, Cg and Co components, respectively, as explained in section VII.C. When one of these adjustment factors is applied to a small QP value, the QP value may become negative, which is problematic for some operations using the QP value. Therefore, the encoder or decoder clips the QP value at zero.

In some example implementations, when a QP value is used during encoding or decoding, the encoder or decoder may perform a modulus operation (%) involving the QP value:

$$d[x][y]=\text{Clip3}(\text{coeffMin},\text{coeffMax},((\text{TransCoeffLevel}$$
$$[xTbY][yTbY][cIdx][x][y]*m[x][y]*\text{levelScale}$$
$$[qP\%6]<<(qP/6))+(1<<(\text{bdShift}-1)))>>\text{bdShift}),$$

where TransCoeffLevel[xTbaY][yTbY][cIdx][x][y] is a transform coefficient value for position (x, y) of color component cIdx for the TB located at position (xTbY, yTbY) in the current picture, m[x][y] is a weight value, levelScale[qP %6]<<(qP/6) indicates a quantization step size, bdShift is a shift value depending on bit depth, and the function Clip3(min, max, value) clips value to be between min and max. The modulus operation (%) is not defined for negative values. To address that problem, the encoder or decoder applies a clip operation after modification of a QP value by the per component color space adjustment factor. Specifically, the encoder or decoder applies the operation max(0, qP) after modification of qP:

If cIdx is 0, qP=max(0, Qp'$_Y$+(cu_residual_act_flag [xTbY][yTbY]?−5:0))

If cIdx is 1, qP=max(0, Qp'$_{Cb}$+(cu_residual_act_flag [xTbY][yTbY]?−5:0))

If cIdx is 2, qP=max(0, Qp'$_{Cr}$+(cu_residual_act_flag [xTbY][yTbY]?−3:0)).

In these operations, cu_residual_act_flag[xTbY][yTbY] indicates the value of the ACT flag for the TB. The QP adjustment factor (−5, −5 or −3) is applied if the ACT flag for the TB is 1 (indicating ACT operations have been applied, such that adjusted variables Qp'$_Y$, Qp'$_{Cb}$, and QP'$_{Cr}$ apply for the Y, Cg and Co components, respectively, depending on the value of the color component index cIdx). Otherwise, no adjustment is applied. The operation max(0, qP) returns the higher value of 0 and qP.

In another approach, for at least some of the adjustment factors, the encoder or decoder avoids negative QP values by using positive adjustment factor values that compensate for an increase in bit depth for sample values in the second color space due to ACT operations. For example, if the first color space is an RGB-type color space (such as GBR) and the second color space is a YCoCg-type color space (such as YCgCo), and the increase in bit depth is a single bit, the adjustment factors can be 1, 1 and 3 for the Y, Cg and Co components, respectively. The increase of 1 in bit depth corresponds to scaling by a factor of 2, which can be countered by increasing QP value by 6. (When QP value increases by 1, quantization step size increases by a factor of $2^{1/6}$, so increasing QP value by 6 causes quantization step size to increase by a factor of 2.) The adjustment factors of 1, 1 and 3 are derived by adding 6 to each of the adjustment factors −5, −5 and −3 for Y, Cg and Co components, respectively. When the positive adjustment factors of 1, 1 and 3 are applied depending on the value of the ACT flag, the resulting QP value is never negative.

In some example implementations, the per component color space adjustment factors can be applied as follows.

If cIdx is 0, qP=Qp'$_Y$+(cu_residual_act_flag[xTbY] [yTbY]?1:0)

If cIdx is 1, qP=Qp'$_{Cb}$+(cu_residual_act_flag[xTbY] [yTbY]?1:0)

If cIdx is 2, qP=Qp'$_{Cr}$+(cu_residual_act_flag[xTbY] [yTbY]?3:0)

In these operations, cu_residual_act_flag[xTby][yTbY] indicates the value of the ACT flag for the TB. The QP adjustment factor (+1, +1 or +3) is applied if the ACT flag for the TB is 1 (indicating ACT operations have been applied, such that adjusted variables $Qp'_Y$, $Qp'_{Cb}$ and $QP'_{Cr}$ apply for the Y, Cg and Co components, respectively). Otherwise, no adjustment is applied.

The increase in bit depth for the sample values in the second color space can be provided using modified ACT operations. In lossy coding mode (in H.265/HEVC implementations, when cu_transquant_bypass_flag equals 0), for ACT operations, the encoder or decoder can compute sample values $Ps_Y$, $Ps_{Cg}$, and $Ps_{Co}$ for a position in YCgCo color space (with an increased bit depth) from sample values $Ps_R$, $Ps_G$ and $Ps_B$ for the position in an RGB-type color space by operations mathematically equivalent to:

$$Ps_Y(Ps_R+(2*Ps_G)+Ps_B+1)\!>\!>\!1$$

$$Ps_{Co}=(2*(Ps_R-Ps_B)+1)\!>\!>\!1$$

$$Ps_{Cg}=((2*Ps_G)-Ps_R-Ps_B+1)\!>\!>\!1$$

Compared to the lossy GBR→YCgCo ACT operations described in section VII.C, the sample values are normalized by a factor of 2 (that is, >>1) instead of a factor of 4. If ACT operations are applied to non-residual values whose minimum value is zero, the dynamic range of the sample values in YCgCo color space can be adjusted by adding an offset value similar to the add_value offset described in section VII.C. Since the bit depth of the Co and Cg components is greater by 1 bit, the offset value can be doubled. If the ACT operations are applied to residual values whose dynamic range includes negative values and positive values, offset values need not be applied. Also, the sample values $Ps_Y$, $Ps_{Co}$, and $Ps_{Cg}$ can be clipped in the range defined by a minimum sample value and maximum sample value.

Conversely, the encoder or decoder can compute sample values $Rs_R$, $Rs_G$ and $Rs_B$ for a position in an RGB-type color space (such as GBR) from sample values $Rs_Y$, $Rs_{Cg}$, and $Rs_{co}$ for the position in YCgCo color space (with an increased bit depth) by operations mathematically equivalent to:

$$Rs_R=(Rs_Y+Rs_{Co}-Rs_{Cg}+1)\!>\!>\!1$$

$$Rs_G=(Rs_Y+Rs_{Cg}+1)\!>\!>\!1$$

$$Rs_B=(Rs_Y-Rs_{Co}-Rs_{Cg}+1)\!>\!>\!1$$

Compared to the lossy YCgCo→GBR ACT operations described in section VII.C, the values are normalized by a factor of 2 (that is, >>1) instead of no normalization. Before the ACT operations, the dynamic range of the sample values in YCgCo color space can be adjusted by removing an offset value, if an offset value was added as described in the previous paragraph. Also, the sample values $Rs_R$, $Rs_G$, and $Rs_B$ can be clipped in the range defined by a minimum sample value and maximum sample value. In some implementations, a temporary variable can store the value $Rs_Y$–$Rs_{Cg}$ for use in the operations.

As a general rule, when lossless ACT operations are used during lossless coding and decoding, because sample values are not quantized or inverse quantized, QP values need not be adjusted by per component color space adjustment factors. Lossless ACT operations can also be used for lossy coding and decoding, however. See section VII.H. In this case, the lossless ACT operations can be modified to increase bit depth for certain color components, as described below, thereby avoiding the use of negative values for per component color space adjustment factors.

G. Innovations in ACT Operations for Color Components with Different Bit Depths In many cases when ACT is enabled, color components in the first color space have the same bit depth. For example, R, G and B color components each have a bit depth of 8. In some cases, however, color components in the first color space have different bit depths. One way to address this situation is to disable ACT when color components in the first color space have different bit depths. Another way is to normalize sample values to a uniform bit depth as described in this section. According to a fourth set of innovations described herein, an encoder performs ACT operations that account for color components with different bit depths. A decoder performs corresponding ACT operations that account for color components with different bit depths.

FIGS. 23a and 23b are flowcharts illustrating a technique (2300) for encoding that includes ACT for color components with different bit depths. An image encoder or video encoder such as one described with reference to FIG. 3 or FIGS. 5a-5b, or other encoder, can perform the technique (2300). FIGS. 24a and 24b are flowcharts illustrating a technique (2400) for corresponding decoding that includes ACT for color components with different bit depths. An image decoder or video decoder such as one described with reference to FIG. 4 or FIG. 6, or other decoder, can perform the technique (2400).

With reference to FIG. 23a, an encoder encodes (2310) a unit (e.g., a CU, slice or picture) of an image or video to produce encoded data. The unit includes color components in a first color space (such as an RGB-type color space). At least two of the color components in the first color space have different bit depths (e.g., all three color components have different bit depths, or two color components have a different bit depth compared to a third color component). As part of the encoding (2310), the encoder switches from the first color space to a second color space (such as a YUV-type color space) using an ACT process that accounts for the different bit depths. The encoder outputs (2320) the encoded data as part of a bitstream.

For example, as shown in FIG. 23b, as part of the ACT process, the encoder can determine (2312) a given bit depth (e.g., maximum bit depth, minimum bit depth, median bit depth) among the different bit depths for the color components in the first color space, selectively scale (2314) sample values of the color components in the first color space, respectively, to the given bit depth, and perform (2316) ACT operations on the selectively scaled sample values. The ACT operations can be lossy or lossless.

With reference to FIG. 24a, a decoder receives (2410) encoded data as part of a bitstream. The decoder decodes (2420) the encoded data to reconstruct a unit (e.g., a CU, slice or picture) of an image or video. The unit includes color components in a first color space (such as an RGB-type color space). At least two of the color components in the first color space have different bit depths (e.g., all three color components have different bit depths, or two color components have a different bit depth compared to a third color component). As part of the decoding (2420), the decoder switches to the first color space from a second color space (such as a YUV-type color space) using an ACT process that accounts for the different bit depths.

For example, as shown in FIG. 24b, as part of the ACT process, the decoder can determine (2412) a given bit depth (e.g., maximum bit depth, minimum bit depth, median bit depth) among the different bit depths for the color components in the first color space, perform (2414) ACT operations on sample values of color components in the second color space, and selectively scale (2416) sample values of the color components in the first color space from the given bit depth to the different bit depths for the color components in the first color space, respectively. The ACT operations can be lossy or lossless.

In some examples described herein, an encoder and decoder normalize sample values to a maximum bit depth among the different bit depths of color components in the first color space. For lossy coding mode (in H.265/HEVC implementations, when cu_transquant_bypass_flag equals 0), the ACT process for GBR to YCgCo transformation can be performed as follows. Suppose the bit depths for the three color components in the GBR color space are $BD_G$, $BD_B$ and $BD_R$. Using the sample values $Ps_G$, $Ps_B$ and $Ps_R$ (possibly with different bit depths) for a position in GBR color space, the sample values $Ps_Y$, $Ps_{Cg}$, and $Ps_{Co}$ for the position in YCgCo color space can be calculated by operations mathematically equivalent to:

$BD_{max} = \max(BD_G, BD_B, BD_R)$ $Ps_G = Ps_G << (BD_{max} - BD_G)$ $Ps_B = Ps_B << (BD_{max} - BD_B)$ $Ps_R = Ps_R << (BD_{max} - BD_R)$ $Ps_Y = (Ps_R + (2*Ps_G) + Ps_B + 2) >> 2$ $Ps_{Co} = ((2*(Ps_R - Ps_B)) + 2) >> 2)$ $Ps_{Cg} = (((2Ps_G) - Ps_R - Ps_B + 2) >> 2)$ The ACT process for corresponding YCgCo to GBR transformation can be performed as follows. Using the sample values $Rs_Y$, $Rs_{Cg}$ and $Rs_{Co}$ for a position in YCgCo color space, the sample values $Rs_G$, $Rs_B$, and $Rs_R$ (possibly with different bit depths) for the position in GBR color space can be calculated by operations mathematically equivalent to:

$BD_{max} = \max(BD_G, BD_B, BD_R)$ $Rs_R = Rs_Y + Rs_{Co} - Rs_{Cg}$ $Rs_G = Rs_Y + Rs_{Cg}$ $Rs_B = Rs_Y - Rs_{Co} - Rs_{Cg}$ $Rs_G = (Rs_G + \text{offset}_G) >> (BD_{max} - BD_G)$ $Rs_B = (Rs_B + \text{offset}_B) >> (BD_{max} - BD_B)$ $Rs_R = (Rs_R + \text{offset}_R) >> (BD_{max} - BD_R)$ where the offset values are defined as follows. If $BD_{max} - BD_G$ is greater than 0, $\text{offset}_G$ is $1 << (BD_{max} - BD_G - 1)$; otherwise, $\text{offset}_G$ is 0. If $BD_{max} - BD_B$ is greater than 0, $\text{offset}_B$ is $1 << (BD_{max} - BD_B - 1)$; otherwise, $\text{offset}_B$ is 0. If $BD_{max} - BD_R$ is greater than 0, $\text{offset}_R$ is $1 << (BD_{max} - BD_R - 1)$; otherwise, $\text{offset}_R$ is 0. In some implementations, a temporary variable can store the value $Rs_Y - Rs_{Cg}$ for use in the operations. In these ACT operations with bit depth normalization, offset values (such as the add value offset values in section VII.C) are not used to change the dynamic range of Cg and Co components. Since the ACT operations are applied to residual data values whose range includes negative values and positive values centered around zero, and since the middle value of the range for Cg and Co components is also zero, no offset values are used to adjust dynamic range. Alternatively, offset values can be used to adjust the dynamic range of Cg and Co components.

After the ACT operations, the bit depth of the second color space (that is, $BD_{max}$) is used for encoding and decoding operations. Thus, when the sample values are in the second color space, $BD_{max}$ is used instead of $BD_G$, $BD_B$ or $BD_R$ (or $BD_Y$ or $BD_C$ for bit depths of primary and secondary color components in the second color space) in decoding operations such as scaling processes for transform coefficients and cross component prediction. This can result in the elimination of certain operations (e.g., in cross component prediction when two bit shifting operations cancel). Although the sample values in the second color space have an increased bit depth during encoding and decoding, lossy coding operations such as quantization can effectively remove redundancy in the sample values.

For lossless coding mode (in H.265/HEVC implementations, when cu_transquant_bypass_flag equals 1), the ACT process for GBR to YCgCo transformation can be performed as follows. Suppose the bit depths for the three color components in the GBR color space are $BD_G$, $BD_B$ and $BD_R$. Using the sample values $Ps_G$, $Ps_B$ and $Ps_R$ (possibly with different bit depths) for a position in GBR color space, the sample values $Ps_Y$, $Ps_{Cg}$, and $Ps_{Co}$ for the position in YCgCo color space can be calculated by operations mathematically equivalent to:

$BD_{max} = \max(BD_G, BD_B, BD_R)$ $Ps_G = Ps_G << (BD_{max} - BD_G)$ $Ps_B = Ps_B << (BD_{max} - BD_B)$ $Ps_R = Ps_R << (BD_{max} - BD_R)$ $Ps_{Co} = Ps_R - Ps_B$ $\text{temp} = Ps_B + (Ps_{Co} >> 1)$ $Ps_{Cg} = Ps_G - \text{temp}$ $Ps_Y = \text{temp} + (Ps_{Cg} >> 1)$ The ACT process for corresponding YCgCo to GBR transformation can be performed as follows. Using the sample values $Rs_Y$, $Rs_{Cg}$ and $Rs_{Co}$ for a position in YCgCo color space, the sample values $Rs_G$, $Rs_B$, and $Rs_R$ (possibly with different bit depths) for the position in GBR color space can be calculated by operations mathematically equivalent to:

$\text{temp} = Rs_Y - (Rs_{Cg} >> 1)$ $Rs_G = Rs_{Cg} + \text{temp}$ $Rs_B = \text{temp} - (Ps_{Co} >> 1)$ $Rs_R = Ps_{Co} + Ps_{Cg}$ $BD_{max} = \max(BD_G, BD_B, BD_R)$ $Rs_G = Rs_G >> (BD_{max} - BD_G)$ $Rs_B = Rs_B >> (BD_{max} - BD_B)$ $Rs_R = Rs_R >> (BD_{max} - BD_R)$ Offset values (as in the lossy coding mode) are not used in the lossless ACT operations.

For lossless coding mode, after the ACT process for GBR to YCgCo transformation, there may be redundancy in sample values in the YCgCo color space. For example, for some special cases, the last one or more bit planes in a color component may be all zeros. In this case, after the GBR to YCgCo transformation, the ACT process can further include dropping one or more bit planes (of zero values) from sample values of one of the color components in the second color space. The dropping can be performed, e.g., by right shifting bit values out of the sample values of the affected color component in the second color space. Then, before the corresponding YCgCo to GBR transformation, the ACT process further includes adding one or more bit planes (of zero values) back to the sample values of the one of the color components in the second color space. The adding can be performed, e.g., by left shifting bit values into the sample values of the affected color component in the second color space.

For example, suppose the bit depths of the first color space are $BD_G=10$, $BD_B=8$, and $BD_R=8$. After normalization and conversion to the YCgCo color space (using the lossless ACT operations that account for different bit depths, as described above), the bit depths of the $Ps_Y$, $Ps_{Cg}$, and $Ps_{Co}$ sample values are 10, 11 and 11, respectively. The $Ps_{Co}$ sample value depend only on the $Ps_B$ and $Ps_R$ sample values, which initially had a bit depth of 8 but are left shifted by 2 bits. Because the last two bits of each of the $Ps_B$ and $Ps_R$ sample values are zero, the last two bits of $Ps_{Co}$ sample values are zero, and bit planes for the last two bits of the $Ps_{Co}$ sample values can be dropped after the GBR to YCgCo transformation (but added back before the corresponding YCgCo to GBR transformation).

More generally, for lossless coding mode with bit plane dropping, the ACT process for GBR to YCgCo transformation can be performed by operations mathematically equivalent to:

$$BD_{max}=\max(BD_G,BD_B,BD_R)$$

$$Ps_G=Ps_G<<-BD_G)$$

$$Ps_B=Ps_B<<(BD_{max}-BD_B)$$

$$Ps_R=Ps_R<<(BD_{max}-BD_R)$$

$$Ps_{Co}=Ps_R-Ps_B$$

$$temp=Ps_B+(Ps_{Co}>>1)$$

$$Ps_{Cg}=Ps_G-temp$$

$$Ps_Y=temp+(Ps_{Cg}>>1)$$

$$Ps_{Co}=Ps_{Co}>>(BD_{max}-\max(BD_B,BD_R))$$

The ACT process for corresponding YCgCo to GBR transformation, with bit plane addition, can be performed by operations mathematically equivalent to:

$$Ps_{Co}=Ps_{Co}<<(BD_{max}-\max(BD_B,BD_R))$$

$$temp=Rs_Y-(Rs_{Cg}>>1)$$

$$Rs_G=Rs_{Cg}+temp$$

$$Rs_B=temp-(Ps_{Co}>>1)$$

$$Rs_R=Ps_{Co}+Ps_{Cg}$$

$$BD_{max}=\max(BD_G,BD_B,BD_R)$$

$$Rs_G=Rs_G>>(BD_{max}-BD_G)$$

$$Rs_B=Rs_B>>(BD_{max}-BD_B)$$

$$Rs_R=Rs_R>>(BD_{max}-BD_R)$$

Thus, in this approach, the extent of bit plane dropping/addition depends on the difference between $BD_{max}$ and the higher of $BD_B$ and $BD_R$.

In many of the foregoing examples of ACT operations that account for color components with different bit depths, sample values scaled to $BD_{max}$ are retained throughout encoding and decoding operations, until the ACT operations converting the sample values back to the first color space. Alternatively, for lossy coding mode, after ACT operations during encoding, sample values converted to the second color space can be re-scaled to have the bit depths of the first color space, which may avoid the need to change the bit depth of variables, etc. in encoding and decoding operations. In other words, the ACT process further includes, after performing the ACT operations during encoding, selectively scaling sample values of color components in the second color space back to the different bit depths from the first color space, respectively. Before corresponding ACT operations during decoding, sample values in the second color space are re-scaled to, e.g., the maximum bit depth or other given bit depth. In other words, the ACT process further includes, before performing the ACT operations during decoding, selectively scaling the sample values of the color components in the second color space to the given bit depth (selected from among the different bit depths for the color components in the first color space).

For example, using the sample values $Ps_G$, $Ps_B$ and $Ps_R$ for a position in GBR color space, the sample values $Ps_Y$, $Ps_{Cg}$, and $Ps_{Co}$ for the position in YCgCo color space can be calculated using the lossy ACT operations and then re-scaled by operations mathematically equivalent to:

$$BD_{max}=\max(BD_G,BD_B,BD_R)$$

$$Ps_G=Ps_G<<(BD_{max}-BD_G)$$

$$Ps_B=Ps_B<<(BD_{max}-BD_B)$$

$$Ps_R=Ps_R<<(BD_{max}-BD_R)$$

$$Ps_Y=(Ps_R+(2*Ps_G)+Ps_B+2)>>2$$

$$Ps_{Co}=((2*(Ps_R-Ps_B)+2)>>2)$$

$$Ps_{Cg}=(((2*Ps_G)-Ps_R-Ps_B+2)>>2)$$

$$Ps_Y=(Ps_Y+offset_G)>>(BD_{max}-BD_G)$$

$$Ps_{Cg}=(Ps_{Cg}+offset_R)>>(BD_{max}-BD_B)$$

$$Ps_{Co}=(Ps_{Co}+offset_R)>>(BD_{max}-BD_R)$$

where the offset values $offset_G$, $offset_B$ and $offset_R$ are defined as above. The ACT process for corresponding YCgCo to GBR transformation, with re-scaling to $BD_{max}$ before the ACT operations, can be performed by operations mathematically equivalent to:

$$BD_{max}=\max(BD_G,BD_B,BD_R)$$

$$Rs_Y=Rs_Y<<(BD_{max}-BD_G)$$

$$Rs_{Cg}=Rs_{Cg}<<(BD_{max}-BD_B)$$

$$Rs_{Co}=Rs_{Co}<<(BD_{max}-BD_R)$$

$$Rs_R=Rs_Y+Rs_{Co}-Rs_{Cg}$$

$$Rs_G=Rs_Y+Rs_{Cg}$$

$$Rs_B=Rs_Y-Rs_{Co}-Rs_{Cg}$$

$$Rs_G=(Rs_G+offset_G)>>(BD_{max}-BD_G)$$

$$Rs_B=(Rs_B+offset_B)>>(BD_{max}-BD_B)$$

$$Rs_R=(Rs_R+offset_R)>>(BD_{max}-BD_R)$$

where the offset values $\text{offset}_G$, $\text{offset}_B$, and $\text{offset}_R$ are defined as above.

Alternatively, an encoder and decoder perform ACT operations that account for color components with different bit depths in some other way.

H. Innovations in Unification of Lossy and Lossless ACT

According to a fifth set of innovations described herein, an encoder and decoder switch color spaces using lossless ACT operations whether coding mode is lossy or lossless. The lossless ACT operations are invertible. They can be used in lossless coding mode, as described above, but can also be used in lossy coding mode. This can simplify the implementation of ACT operations, without harming the coding efficiency of lossy coding.

FIG. 25 illustrates a generalized technique (2500) for encoding that includes switching of color spaces using lossless ACT operations whether coding mode is lossy or lossless. An image encoder or video encoder such as one described with reference to FIG. 3 or FIGS. 5a-5b, or other encoder, can perform the technique (2500). FIG. 26 illustrates a generalized technique (2600) for corresponding decoding that includes switching of color spaces using lossless ACT operations whether coding mode is lossy or lossless. An image decoder or video decoder such as one described with reference to FIG. 4 or FIG. 6, or other decoder, can perform the technique (2600).

With reference to FIG. 25, an encoder encodes (2510) a unit (e.g., CU, slice, picture) of an image or video to produce encoded data. As part of the encoding (2510), the encoder switches from a first color space to a second color space. The switching uses lossless ACT operations whether coding mode is lossy or lossless. The encoder outputs (2520) the encoded data as part of a bitstream.

With reference to FIG. 26, a decoder receives (2610) encoded data as part of a bitstream. The decoder decodes (2620) the encoded data to reconstruct a unit (e.g., CU, slice, picture) of an image or video. As part of the decoding (2620), the decoder switches to a first color space from a second color space. The switching uses lossless ACT operations whether coding mode is lossy or lossless.

When the coding mode is lossy, as part of encoding, the encoder can adjust quantization and/or scaling for color components in the second color space according to per component color space adjustment factors (e.g., QP adjustment factors as described in section VII.C or section VII.F). As part of decoding, the decoder can adjust inverse quantization and/or scaling for color components in the second color space according to such adjustment factors. For example, when the first color space is an RGB-type color space (such as GBR) and the second color space is YCgCo, the adjustment factors can be −5, 1 and 3 for Y, Cg and Co components, respectively.

The encoder and decoder can avoid negative QP values by clipping intermediate or final QP values for the color components in the second color space (adjusted according to the adjustment factors) at zero. Or, the encoder and decoder can avoid negative QP values by, for at least some of the adjustment factors, using positive values that compensate for an increase in bit depth for sample values in the second color space after ACT operations. For example, when the first color space is an RGB-type color space (such as GBR) and the second color space is YCgCo, and the increase in bit depth is a single bit for selected color component(s), the per component color space adjustment factors can be 1, 1 and 3 for Y, Cg and Co components, respectively.

Thus, whether the coding mode is lossy or lossless (in H.265/HEVC implementations, whether cu_transquant_bypass_flag is 0 or 1), an encoder can use lossless (invertible) ACT operations. For example, the encoder can switch from the GBR color space to the YCgCo color space using the lossless ACT operations described in section VII.C:

$$Ps_{Co}=Ps_R-Ps_B$$

$$\text{temp}=Ps_B+(Ps_{Co}>>1)$$

$$Ps_{Cg}=Ps_G-\text{temp}$$

$$Ps_Y=\text{temp}+(Ps_{Cg}>>1)$$

Later, a decoder can losslessly switch from the YCgCo color space back to the GBR color space using the lossless ACT operations described in section VII.C:

$$\text{temp}=Rs_Y-(Rs_{Cg}>>1)$$

$$Rs_G=Rs_{Cg}+\text{temp}$$

$$Rs_B=\text{temp}-(Ps_{Co}>>1)$$

$$Rs_R=Ps_{Co}+Ps_{Cg}$$

When the coding mode is lossy, the encoder and decoder can adjust QP values using per component color space adjustment factors. For example, the basic adjustment factors can be −5, −5 and −3 for Y, Cg and Co components, respectively. In these lossless ACT operations, the bit depth of the sample values of the Cg and Co components increases by 1. The increase of 1 in bit depth corresponds to scaling by a factor of 2, which can be countered by increasing QP value by 6. Adjustment factors of −5, 1 and 3 for Y, Cg and Co components, respectively, are derived by adding 6 to each of adjustment factors −5 and −3 for the Cg and Co components, respectively. The encoder or decoder can apply the QP adjustment factors, and use clipping to avoid a negative QP value for the Y component, as follows:

If cIdx is 0, qP=max(0, Qp'$_Y$+(cu_residual_act_flag [xTbY][yTbY]?−5:0))

If cIdx is 1, qP=Qp'$_{Cb}$ (cu_residual_act_flag[xTbY][yTbY]?1:0)

If cIdx is 2, qP=Qp'$_{Cr}$+(cu_residual_act_flag[xTbY][yTbY]?3:0) In these operations, cu_residual_act_flag[xTbY][yTbY] indicates the value of the ACT flag for the TB. The QP adjustment factor (−5, +1 or +3) is applied if the ACT flag for the TB is 1 (indicating ACT operations have been applied, such that adjusted variables Qp'$_Y$, Qp'$_{Cb}$ and Qp'$_{Cr}$ apply for the Y, Cg and Co components, respectively, depending on the value of the color component index cIdx). Otherwise, no adjustment is applied.

Or, when the coding mode is lossy, the encoder and decoder can avoid negative QP values for the Y component by increasing bit depth for sample values of the Y component in the lossless ACT operations. For example, the encoder can switch from the GBR color space to the YCgCo color space using the following ACT operations, which are based on the lossless ACT operations but add a final step for lossy coding mode:

$$Ps_{Co}=Ps_R-Ps_B$$

$$\text{temp}=Ps_B+(Ps_{Co}>>1)$$

$$Ps_{Cg}=Ps_G-\text{temp}$$

$$Ps_Y=(\text{temp}+(Ps_{Cg}>>1))<<1$$

Compared to the basic lossless ACT operations, the sample values of the Y component are left shifted by 1 bit (but only in lossy coding mode). Later, when the coding mode is lossy, a decoder can switch from the YCgCo color space back to the GBR color space using the following ACT operations, which are based on the lossless ACT operations but add an initial step for lossy coding mode. The ACT operations include initially right shifting the sample values of the Y component by 1 bit (but only in lossy coding mode):

$$Rs_Y = (Rs_Y + 1) >> 1$$

$$temp = Rs_Y - (Rs_{Cg} >> 1)$$

$$Rs_G = Rs_{Cg} + temp$$

$$Rs_B = temp - (Ps_{Co} >> 1)$$

$$Rs_R = Ps_{Co} Ps_{Cg}$$

In these ACT operations, the bit depths of the sample values of the Y, Cg and Co components is increased by 1. Adjustment factors of 1, 1 and 3 for the Y, Cg and Co components are derived by adding 6 to each of the adjustment factors −5, −5 and −3 for the Y, Cg and Co components, respectively. The encoder or decoder can apply the QP adjustment factors as follows:

If cIdx is 0, qP=Qp'$_Y$+(cu_residual_act_flag[xTbY][yTbY]?1:0)

If cIdx is 1, qP=Qp'$_{Cb}$+(cu_residual_act_flag[xTbY][yTbY]?1:0)

If cIdx is 2, qP=Qp'$_{Cr}$+(cu_residual_act_flag[xTbY][yTbY]?3:0) In these operations, the QP adjustment factor (+1, +1 or +3) is applied if the ACT flag for the TB is 1 (indicating ACT operations have been applied, such that adjusted variables Qp'$_Y$, Qp'$_{Cb}$ and Qp'$_{Cr}$ apply for the Y, Cg and Co components, respectively, depending on the value of the color component index cIdx). Otherwise, no adjustment is applied.

Alternatively, an encoder and decoder can switch color spaces using different ACT operations whether coding mode is lossy or lossless, as described in section VII.C and elsewhere.

I. Innovations in Cross-component Prediction After ACT

Cross-component prediction involves prediction of the residual data values of a secondary color component using the residual data values of a primary color component. According to a sixth set of innovations described herein, an encoder and decoder perform cross-component prediction that accounts for bit depths of color components in a second color space.

Figure 27:
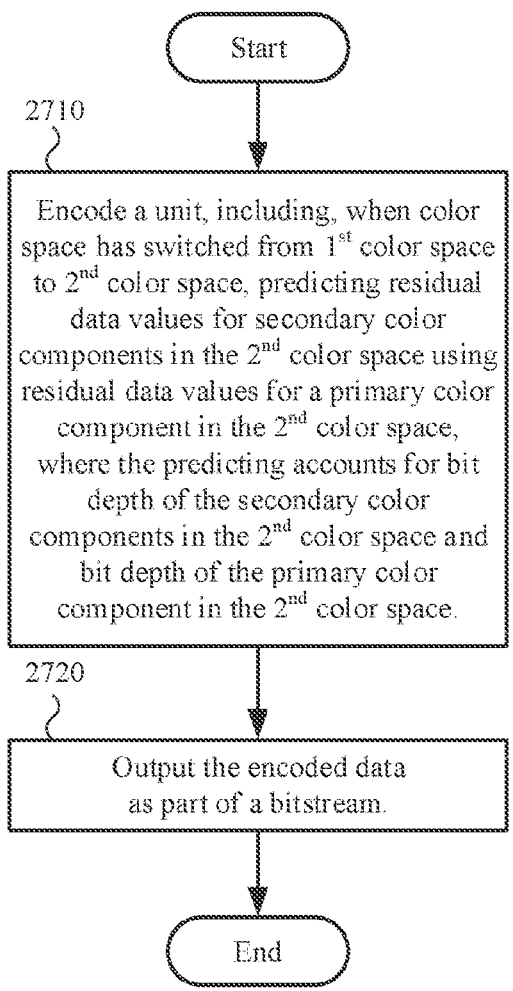
FIGS. 27 and 28 are flowcharts illustrating generalized techniques for encoding and decoding, respectively, including cross-component prediction that accounts for bit depths of color components in a second color space.
Figure 28:
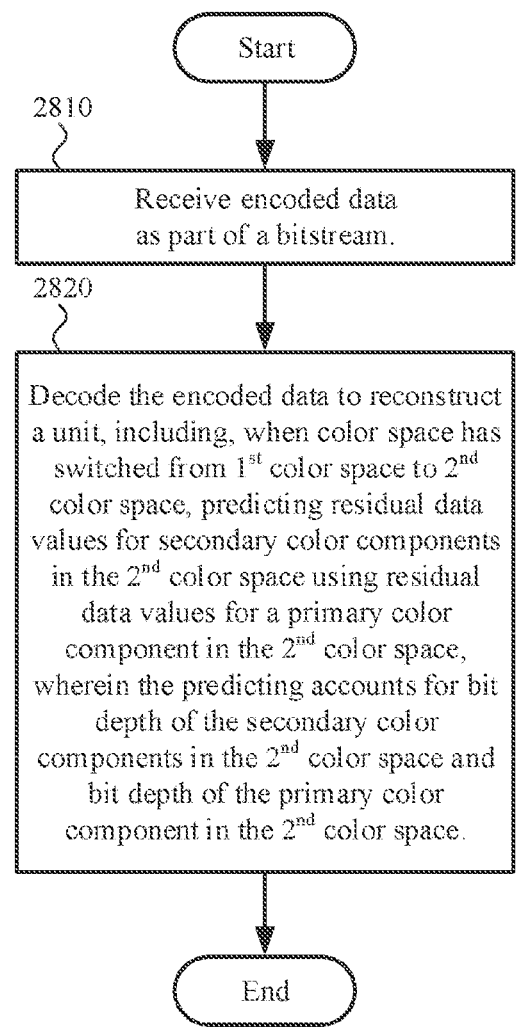

FIG. 27 illustrates a generalized technique (2700) for encoding that includes cross-component prediction that accounts for bit depths of color components in a second color space. An image encoder or video encoder such as one described with reference to FIG. 3 or FIGS. 5a-5b, or other encoder, can perform the technique (2700). FIG. 28 illustrates a generalized technique (2800) for corresponding decoding that includes cross-component prediction that accounts for bit depths of color components in a second color space. An image decoder or video decoder such as one described with reference to FIG. 4 or FIG. 6, or other decoder, can perform the technique (2800).

With reference to FIG. 27, an encoder encodes (2710) a unit (e.g., CU, slice, picture) of an image or video to produce encoded data. As part of the encoding (2710), when color space has switched from a first color space to a second color space, the encoder predicts residual data values for secondary color components in the second color space using residual data values for a primary color component in the second color space. The prediction process accounts for bit depth of the secondary color components in the second color space and bit depth of the primary color component in the second color space. The encoder outputs (2720) the encoded data as part of a bitstream.

With reference to FIG. 28, a decoder receives (2810) encoded data as part of a bitstream. The decoder decodes (2820) the encoded data to reconstruct a unit (e.g., CU, slice, picture) of an image or video. As part of the decoding (2820), when color space has switched from a first color space to a second color space, the decoder predicts residual data values for secondary color components in the second color space using residual data values for a primary color component in the second color space. The prediction process accounts for bit depth of the secondary color components in the second color space and bit depth of the primary color component in the second color space.

For example, for the prediction, the encoder or decoder converts the residual data values for the primary color component to the bit depth of the secondary color components in the second color space. The encoder or decoder scales the converted residual data values for the primary color component. The scaling can use a scaling factor and a normalization factor. The encoder or decoder then combines the residual data values for the secondary color components and the scaled residual data values for the primary color component.

In some example implementations, both secondary color components have the same bit depth, which can be different than the primary color component. When ACT operations are used for a unit to transform from an RGB-type color space (such as GBR) to YCgCo, the cross-component prediction process is performed in a manner mathematically equivalent to:

$$r[x][y] += (ResScaleVal[cIdx][xTbY][yTbY] * ((rY[x][y] << BD_{CoCg}) >> BD_Y)) >> 3$$

where r[x][y] represents a residual value of a secondary color component (Co or Cg) at position (x, y), ResScaleVal[cIdx][xTbY][yTbY] indicates a scaling value for the cross-component prediction process for color component cIdx for the TB located at position (xTbY, yTbY) in the current picture, rY[x][y] represents a residual data value of the Y component at the position (x, y), BD$_{CoCg}$ indicates bit depth of the Co and Cg components, and BD$_Y$ indicates bit depth of the Y component.

As another example, when lossless ACT operations are used, even if all color components in the first color space have the same bit depth, the bit depth for some color components in the second color space may be increased. For example, the bit depth of Cg and Co components may be increased by 1 bit in lossless GBR to YCgCo ACT operations. That is, the bit depth of the secondary color components is increased by 1 bit, even though the bit depth of the primary color component is unchanged. In this case, the cross-component prediction process can be performed in a manner mathematically equivalent to:

$$r[x][y] += (ResScaleVal[cIdx][xTbY][yTbY] * ((rY[x][y] << BD_S + 1) >> BD_P)) >> 3$$

where BD$_S$ indicates bit depth for the secondary color components of the first color space, increased by 1 bit (BD$_S$+1) for the Co and Cg components due to the lossless ACT operations, and $BD_P$ indicates bit depth of the primary color component in the first color space.

As another example of the interaction between bit depths and cross-component prediction processes, if $BD_{CoCg}$ equals $BD_Y$ (e.g., due to normalization of bit depths, when lossy ACT operations are performed), $(rY[x][y]<<BD_{CoCg})>>BD_Y)$ can be replaced with $(rY[x][y])$ in the cross-component prediction process.

As another example of the interaction between bit depths and cross-component prediction processes, when $BD_{CoCg}$ is 1 bit larger than $BD_Y$ (e.g., when lossless ACT operations are performed after normalization of bit depths), $(rY[x][y]<<BD_{CoCg})>>BD_Y)$ can be replaced with $(rY[x][y]<<1)$ in the cross-component prediction process.

VIII. Alternatives and Variations

Many of the preceding examples illustrate combinations of the innovations described herein. In general, any of the innovations in signaling of control information for ACT operations (see sections VII.D and VII.E) can be used with any one or more of the innovations for ACT operations (see sections VII.F to VII.H) or cross-component prediction (see section VII.I). Any of the innovations in ACT operations (see sections VII.F to VII.H) can be used with any of the innovations for cross-component prediction (see section VII.I).

Many of the preceding examples use bit shift operations. In general, multiplication operations (by a factor of 2) can be used instead of left shifting operations in ACT operations described herein. Similarly, division operations (by a factor of 2) can be used instead of right shifting operations in the ACT operations described herein, but this can lead to different results if sample values may be negative. Also, rounding factors and offset values (e.g., +1 in some of the ACT operations listed above) can be omitted or, for negative sample values, changed to negative rounding factors or offset values.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system with a video encoder, a method comprising:
    encoding video to produce encoded data, wherein the encoding the video includes:
        evaluating a condition for a sequence of the video;
        conditionally signaling a syntax element that indicates whether adaptive color space transformation ("ACT") is enabled for the sequence of the video, including signaling the syntax element that indicates whether ACT is enabled if the condition is satisfied but otherwise skipping the signaling the syntax element that indicates whether ACT is enabled;
        for each of multiple coding units ("CUs") of a picture of the sequence of the video, encoding the CU to produce part of the encoded data, wherein the encoding the CU includes:
            evaluating a condition for the CU, wherein the evaluating the condition for the CU includes checking whether ACT is enabled for the sequence of the video; and
            conditionally signaling a syntax element that indicates color space for the CU, including signaling the syntax element that indicates the color space for the CU if the condition for the CU is satisfied but otherwise skipping the signaling the syntax element that indicates the color space for the CU; and
    outputting the encoded data as part of a bitstream.

2. The method of claim 1, wherein the syntax element that indicates whether ACT is enabled is a flag value signaled as part of a sequence parameter set for the sequence of the video.

3. The method of claim 1, wherein the evaluating the condition for the sequence of the video includes checking whether chroma format is 4:4:4, and wherein satisfaction of the condition for the sequence of the video depends at least in part on the chroma format being 4:4:4.

4. The method of claim 1, wherein the encoding the CU further includes:
    determining that the color space for the CU has switched between a first color space and a second color space, wherein the first color space is an RGB-type color space and the second color space is a YCoCg-type color space; and
    performing color space transform operations on residual values for the CU.

5. The method of claim 4, wherein the encoding the CU further includes reconstructing the CU, including:
    adjusting inverse quantization for color components in the second color space according to per component color space adjustment factors.

6. The method of claim 5, wherein, for the inverse quantization, negative quantization parameter ("QP") values are avoided by:
    clipping intermediate or final QP values for the color components in the second color space at zero, the intermediate or final QP values for the color components in the second color space having been adjusted according to the per component color space adjustment factors.

7. The method of claim 5, wherein, for the inverse quantization, negative quantization parameter ("QP") values are avoided by:
    for at least some of the per component color space adjustment factors, using positive values that compensate for an increase in bit depth for values in the second color space.

8. The method of claim 5, wherein the per component color space adjustment factors are −5, 1, and 3 for Y, Cg, and Co components, respectively.

9. A computing system comprising one or more processing units and memory, the computing system implementing a video decoder configured to perform decoding operations comprising:
    receiving encoded data as part of a bitstream; and
    decoding the encoded data to reconstruct video, wherein the decoding the encoded data to reconstruct the video includes:
        evaluating a condition for a sequence of the video;
        conditionally parsing a syntax element that indicates whether adaptive color space transformation ("ACT") is enabled for the sequence of the video, including parsing the syntax element that indicates whether ACT is enabled if the condition is satisfied but otherwise skipping the parsing the syntax element that indicates whether ACT is enabled;

for each of multiple coding units ("CUs") of a picture of the sequence of the video, decoding part of the encoded data to reconstruct the CU, wherein the decoding the part of the encoded data to reconstruct the CU includes:

evaluating a condition for the CU, wherein the evaluating the condition for the CU includes checking whether ACT is enabled for the sequence of the video; and conditionally parsing a syntax element that indicates color space for the CU, including parsing the syntax element that indicates the color space for the CU if the condition for the CU is satisfied but otherwise skipping the parsing the syntax element that indicates the color space for the CU.

10. The computer system of claim 9, wherein the syntax element that indicates whether ACT is enabled is a flag value signaled as part of a sequence parameter set for the sequence of the video.

11. The computer system of claim 9, wherein the evaluating the condition for the sequence of the video includes checking whether chroma format is 4:4:4, and wherein satisfaction of the condition for the sequence of the video depends at least in part on the chroma format being 4:4:4.

12. The computer system of claim 11, wherein another syntax element in the encoded data indicates the chroma format.

13. The computer system of claim 9, wherein the decoding the part of the encoded data to reconstruct the CU further includes:

determining, based at least in part on the syntax element that indicates the color space for the CU, that the color space for the CU has switched between a first color space and a second color space, wherein the first color space is an RGB-type color space and the second color space is a YCoCg-type color space;

adjusting inverse quantization for color components in the second color space according to per component color space adjustment factors; and performing color space transform operations on residual values for the CU.

14. The computer system of claim 13, wherein, for the inverse quantization, negative quantization parameter ("QP") values are avoided by:

clipping intermediate or final QP values for the color components in the second color space at zero, the intermediate or final QP values for the color components in the second color space having been adjusted according to the per component color space adjustment factors.

15. The computer system of claim 13, wherein, for the inverse quantization, negative quantization parameter ("QP") values are avoided by:

for at least some of the per component color space adjustment factors, using positive values that compensate for an increase in bit depth for values in the second color space.

16. The computer system of claim 13, wherein the per component color space adjustment factors are −5, 1, and 3 for Y, Cg, and Co components, respectively.

17. The computer system of claim 13, wherein the color space transform operations are applied to values $R_Y$, $R_{Cg}$, and $R_{Co}$ for Y, Cg, and Co components, respectively, to produce values $R_R$, $R_G$, and $R_B$ for R, G, and B components, respectively, according to:

$$\text{temp} = R_Y - (R_{Cg} >> 1)$$

$$R_G = R_{Cg} + \text{temp}$$

$$R_B = \text{temp} - (R_{Co} >> 1)$$

$$R_R = R_{Co} + R_{Cg}.$$

18. One or more computer-readable tangible memory or storage media having stored thereon encoded data as part of a bitstream, wherein the encoded data includes a syntax element that indicates whether adaptive color space transformation ("ACT") is enabled for a sequence of video, the encoded data resulting from encoding the video to produce the encoded data by encoding operations that include:

evaluating a condition for a sequence of the video;

conditionally signaling a syntax element that indicates whether ACT is enabled for the sequence of the video, including signaling the syntax element that indicates whether ACT is enabled if the condition is satisfied but otherwise skipping the signaling the syntax element that indicates whether ACT is enabled;

for each of multiple coding units ("CUs") of a picture of the sequence of the video, encoding the CU to produce part of the encoded data, wherein the encoding the CU includes:

evaluating a condition for the CU, wherein the evaluating the condition for the CU includes checking whether ACT is enabled for the sequence of the video; and conditionally signaling a syntax element that indicates color space for the CU, including signaling the syntax element that indicates the color space for the CU if the condition for the CU is satisfied but otherwise skipping the signaling the syntax element that indicates the color space for the CU.

19. The one or more computer-readable tangible memory or storage media of claim 18, wherein the syntax element that indicates whether ACT is enabled is a flag value signaled as part of a sequence parameter set for the sequence of the video.

20. The one or more computer-readable tangible memory or storage media of claim 18, wherein the evaluating the condition for the sequence of the video includes checking whether chroma format is 4:4:4, and wherein satisfaction of the condition for the sequence of the video depends at least in part on the chroma format being 4:4:4.

* * * * *